US011922480B2

(12) United States Patent
O'Neil-Dunne et al.

(10) Patent No.: US 11,922,480 B2
(45) Date of Patent: *Mar. 5, 2024

(54) SYSTEM AND METHOD FOR DYNAMIC REAL-TIME CROSS-SELLING OF PASSENGER ORIENTED TRAVEL PRODUCTS

(71) Applicant: Air Black Box Technologies LLC, Miami, FL (US)

(72) Inventors: Timothy O'Neil-Dunne, Kirkland, WA (US); Paul Addy, Bramhall (GB)

(73) Assignee: Air Black Box Technologies LLC, Miami, FL (US)

( * ) Notice: Subject to any disclaimer, the term of this patent is extended or adjusted under 35 U.S.C. 154(b) by 110 days.

This patent is subject to a terminal disclaimer.

(21) Appl. No.: 17/465,730

(22) Filed: Sep. 2, 2021

(65) Prior Publication Data
US 2021/0398191 A1    Dec. 23, 2021

Related U.S. Application Data

(63) Continuation of application No. 16/742,281, filed on Jan. 14, 2020, now Pat. No. 11,138,651, which is a
(Continued)

(51) Int. Cl.
*G06Q 30/00*    (2023.01)
*G06F 16/2455*    (2019.01)
(Continued)

(52) U.S. Cl.
CPC ..... *G06Q 30/0631* (2013.01); *G06F 16/2455* (2019.01); *G06F 16/248* (2019.01);
(Continued)

(58) Field of Classification Search
CPC .......... G06Q 30/0631; G06Q 30/0256; G06Q 30/0621; G06Q 30/0635; G06Q 30/0641; G06Q 50/14; G06F 16/2455; G06F 16/248
(Continued)

(56) References Cited

U.S. PATENT DOCUMENTS 7,401,131 B2 * 7/2008 Robertson ............... H04L 67/01
                                                    707/999.1
7,899,692 B2    3/2011 Caballero et al.
(Continued)

OTHER PUBLICATIONS

McDonald, Michele: "Direct to the customer: American Airlines plans to bypass the GDSs for major accounts with direct connect," Air Transport World, v47i4, Apr. 2010; ProQuest Dialog #224103211 6pgs.*
(Continued)

*Primary Examiner* — Robert M Pond
(74) *Attorney, Agent, or Firm* — Mintz, Levin, Cohn, Ferris, Glovsky and Popeo, P.C.

(57) ABSTRACT

Disclosed is a method for cross-selling passenger-oriented travel products from a sponsor company and other travel product providers to users, by normalizing the products and dynamically filtering the products in real-time according to rules defined by the travel product sponsor company. In one of the embodiments, ancillary products from any combination of an airline sponsor company, affiliated airline companies and other travel product providers may be presented to customers in accordance with the sponsor company's preferred product bundling nor package scheme and in coordination with affiliated airlines and other travel product providers as they may be available for a combined product. Other embodiments cross-sell travel products for rail, sea and other ground transportation, accommodation services
(Continued)

and providers as well as passenger-oriented ancillary travel product providers such as Wi-Fi and duty-free shopping services.

20 Claims, 16 Drawing Sheets

Related U.S. Application Data continuation of application No. 15/898,665, filed on Feb. 19, 2018, now Pat. No. 10,559,020, which is a continuation of application No. 15/488,451, filed on Apr. 15, 2017, now Pat. No. 9,904,964.

(60) Provisional application No. 62/324,470, filed on Apr. 19, 2016.

(51) Int. Cl.
  *G06F 16/248* (2019.01)
  *G06Q 30/0251* (2023.01)
  *G06Q 30/0601* (2023.01)
  *G06Q 50/14* (2012.01)

(52) U.S. Cl.
  CPC ..... *G06Q 30/0256* (2013.01); *G06Q 30/0621* (2013.01); *G06Q 30/0635* (2013.01); *G06Q 30/0641* (2013.01); *G06Q 50/14* (2013.01)

(58) Field of Classification Search
  USPC ...................................... 705/26, 27
  See application file for complete search history.

(56) References Cited

U.S. PATENT DOCUMENTS

| | | | |
|---|---|---|---|
| 9,367,563 B2* | 6/2016 | Fontebride | G06F 16/1873 |
| 11,138,651 B2 | 10/2021 | O'Neil-Dunne et al. | |
| 2002/0173984 A1* | 11/2002 | Robertson | H04L 67/34 |
| | | | 709/220 |
| 2008/0198761 A1 | 8/2008 | Murawski et al. | |
| 2011/0145061 A1 | 6/2011 | Spurr et al. | |
| 2011/0282701 A1* | 11/2011 | Reiz | G06Q 10/02 |
| | | | 705/5 |
| 2012/0004936 A1 | 1/2012 | Hamblett et al. | |
| 2014/0052577 A1 | 2/2014 | Gotlieb et al. | |
| 2015/0199714 A1* | 7/2015 | Reiz | G06Q 30/0251 |
| | | | 705/14.49 |
| 2015/0228018 A1 | 8/2015 | Richman | |
| 2015/0294234 A1 | 10/2015 | Alberola et al. | |
| 2015/0347408 A1* | 12/2015 | Fontebride | G06F 16/258 |
| | | | 707/638 |
| 2016/0378874 A1* | 12/2016 | Jafri | G06Q 30/0207 |
| | | | 707/706 |
| 2017/0046732 A1 | 2/2017 | Elmachtoub et al. | |
| 2020/0151799 A1 | 5/2020 | O'Neil-Dunne et al. | |

OTHER PUBLICATIONS

"Farelogix and Routehappy to Deliver Dynamic Content Pricing, and Offers to Airlines Through Integrated Platforms," Internet Wire Apr. 14, 2016, ProQuest Dialog #449416602 4pgs.*
"Farelogix Airline Commerce Gateway," Archive.org Wayback Machine/www.farelogix.com; 2014, Mar. 31, 2016; Spgs.*
IATA: "New Distribution Capability Standards, Implementation Guide 2.0," Dec. 2015, Archive.org Wayback Machine/iata.org, Apr. 18, 2016, 116pgs.*
UU: Hoyles, Yanik: "New Distribution Capability (NDC), Together Let's Build Airline Retailing," Apr. 2015, Archive.org Wayback Machine/iata.org, Apr. 18, 2016, 57pgs.*
VV: TPConnects Web Site: Archive.org Wayback Machine; tpconnects. com; Mar. 26, 27, 29, 2016, 27pgs.*
WW: "TPConnects to launch new travel aggregator platform," TradeArabia, Sep. 22, 2015, ProQuest Dialog #1714365851, 3pgs.*
XX: "Business Requirements Document Interline Flights Shopping and Order Management," IATA, Oct. 5, 2015, Archive.org Wayback Machine, 103pgs.*
UUU: IATA website: Internet Archive Wayback Machine, www.iata.org; Apr. 12, 2016, 7pgs.*
Blogspot (May 2010) "All About Networking—How the Application Layer Works", Google, networkingtips-tricks.blogspot.com, 4 Pages.

* cited by examiner

| | | Airline S (AS) | | | | Airline H (AH) | |
|---|---|---|---|---|---|---|---|
| | | Economy | | | Business | Economy | |
| Airline | | | | | | | |
| Cabin class | | | | | | | |
| Product name | | Fly | FlyBag | FlyBagEat | FlyBag | Fun | Flex |
| Product class | | E1 | E2 | E3 | J | F1 | F2 |
| Interlined with | | | | | | | |
| Other | | | | | | | |
| Cabin | | Standard Cabin | Standard Cabin | Standard Cabin | An exclusive 24-seat upfront cabin | Standard Cabin | Standard Cabin |
| Checked in bags | | for a fee | 20kg | 20kg | 20kg | none | 30kg |
| Carry-on bag pieces | | 1 + laptop | 1 + laptop | 1 + laptop | 2 | 1 + laptop | 1 + laptop |
| Carry-on bag weight | | up to 7kg + up to 3kg | up to 7kg + up to 3kg | up to 7kg + up to 3kg | up to 15kg each | up to 7kg for main item | up to 7kg for main item |
| Meals | | for a fee | for a fee | Hot Meal | Hot Meal & Beverage | for a fee | for a fee |
| Seat | | Standard | Standard | Standard | Premium + double legroom | Any type | Any type |
| Seat upgrades | | Super or Stretch for a fee | Super or Stretch for a fee | Super or Stretch for a fee | n/a | Upfront or Sweet for a fee | Upfront or Sweet included |
| Auto assigned at check-in | | Yes | Yes | Yes | Yes | Yes | Yes |
| Auto assigned at booking | | for a fee | for a fee | Included | Included | for a fee | Yes |
| Choose at booking | | for a fee | for a fee | Included | Included | for a fee | Yes |
| Choose after booking | | for a fee | for a fee | Included | Included | for a fee | Yes |
| Lounge Access | | | | | Included | | Yes |
| Priority Check-in | | | | | Included | for a fee | |
| Priority boarding | | | | | | | Only at Home |

FIGURE 13

SYSTEM AND METHOD FOR DYNAMIC REAL-TIME CROSS-SELLING OF PASSENGER ORIENTED TRAVEL PRODUCTS

RELATED APPLICATIONS

This application is a continuation of U.S. Ser. No. 15/898,665, filed on Feb. 19, 2018, which is a continuation of U.S. non-provisional application Ser. No. 15/488,451 filed on Apr. 15, 2017 and claims the benefit of U.S. provisional application 62/324,470, filed on Apr. 19, 2016, both of which are incorporated herein in their entirety.

FIELD

The field of this disclosure relates generally to travel industry technology.

BACKGROUND

Historically, Airlines have been limited in their capability to cross sell, package or bundle travel products from other airlines. Typically, airline members of a group of airlines may cooperate according to "interlining" agreements between airlines, giving them a limited capability to sell seats and flight segment tickets from other airlines together their own flight segments as part of a passenger's itinerary. This "interlining" capability has not been extended to the sale of other "ancillary" travel products connected with flight segment such as baggage or premium seating, particularly during the booking process for the airline tickets themselves. Current Internet based multi-sourced travel product data alignment and search mechanisms suffer significant shortcomings including operational, performance and technical inefficiencies.

SUMMARY

Disclosed is a process and system for packaging travel products by alignment or combination from disparate data sources which is driven by the system capability to utilize a configurable logic instruction system incorporated into a database and user interface management platform, which is configured to align individual travel product element data types and attributes as well as bundled travel product data types and attributes. In various embodiments, configurable logic instructions are incorporated into the system logic according to requirements for individual target airlines, to capture the explicit and implicit mechanisms by which an individual airline communicates travel products to users by the user interface. For a plurality of airlines, travel product packages and associated configurable logic instructions are imported into a common database template structure (alignment) which is configured to allow member airlines to market (unaligned) travel products other than just tickets and seats from other carriers by communicating product types and attributes mapped in the database from disparate (unaligned) data sources to users in a single (aligned) interface. The disclosed system and method directly impact the performance and functionality of Internet based travel product user interfaces by improving the performance and efficiency of travel product databases built utilizing the disclosed data product alignment by configurable logical instructions.

BRIEF DESCRIPTION OF THE DRAWINGS

FIG. 13 shows an exemplar chart of travel product classes for 2 exemplar airlines.

DETAILED DESCRIPTION

In various embodiments, the disclosed system utilizes the New Distribution Capability (NDC) standard introduced by the International Air Transportation Association (IATA), an extensible markup language (XML) based data schema which provides a standard for the communication of air travel products, services, their availability and pricing for carriers to sell into the marketplace either directly or via intermediaries. In all the embodiments envisaged by this system, the NDC schemas are at the core of the system internally. However, as airlines and other stakeholders inside the Airline eco-system use a variety of different schemas, some of which are legacy going back to the 1950s in their designs ABB has had to introduce a part of the service which transforms these different and like schemas and their respective implementations. Thus, ABB is able to normalize the data for transformation and processing. It is this function that enables ABB to provide such a wide array of possible implementations for the cross mapping of the services by the use of a smart broker element.

Figure 1:
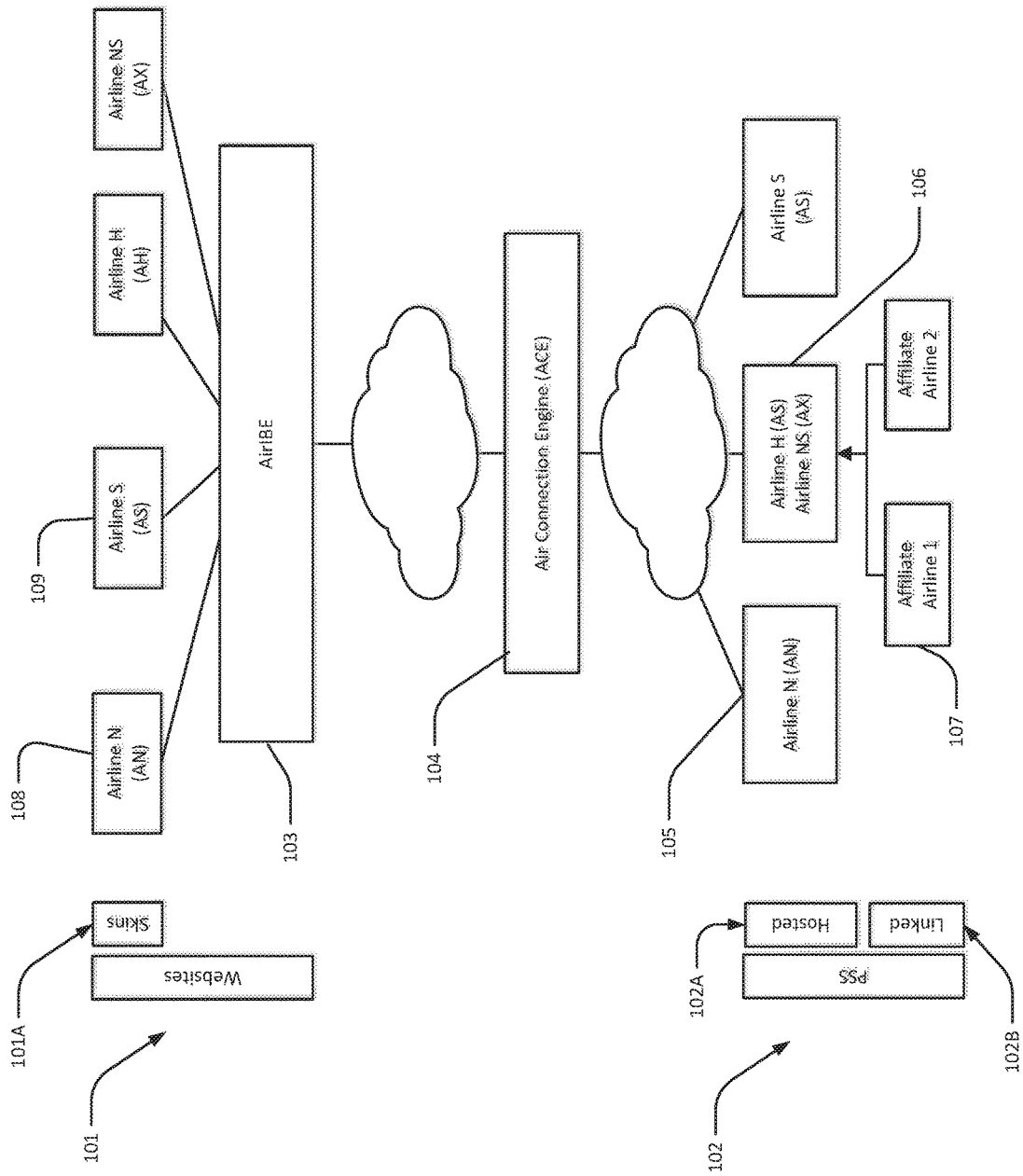
FIG. 1 shows an overview of the disclosed system.

An overview of an embodiment of the system is shown in FIG. 1. In the shown embodiment, the Air Connection Engine (ACE) platform has been designed in a modular way to improve interoperability, maintenance and extensibility. In the shown exemplar embodiment, airline website front and back ends 101 operate through configurable user interfaces or skins according to airline preferences 101A. In various embodiments, the disclosed Air Internet Booking Engine (AirIBE) 103 may be used as a common internet engine for multiple airline user interfaces such as the example airlines Airline N 108 and Airline S 109. Passenger browsing and booking of various travel products including individual and interlined flights, as well as various bundled or unbundled airline add-on's and Special Service Requests (SSR) are generated according to configurable logic instructions by the ACE system from data supplied by Passenger Saks and Service systems (PSS) 102. The PSS sources for airline travel product information may be from hosted 102A or linked 102B airlines 105 106 and 107 respectively.

Figure 2:
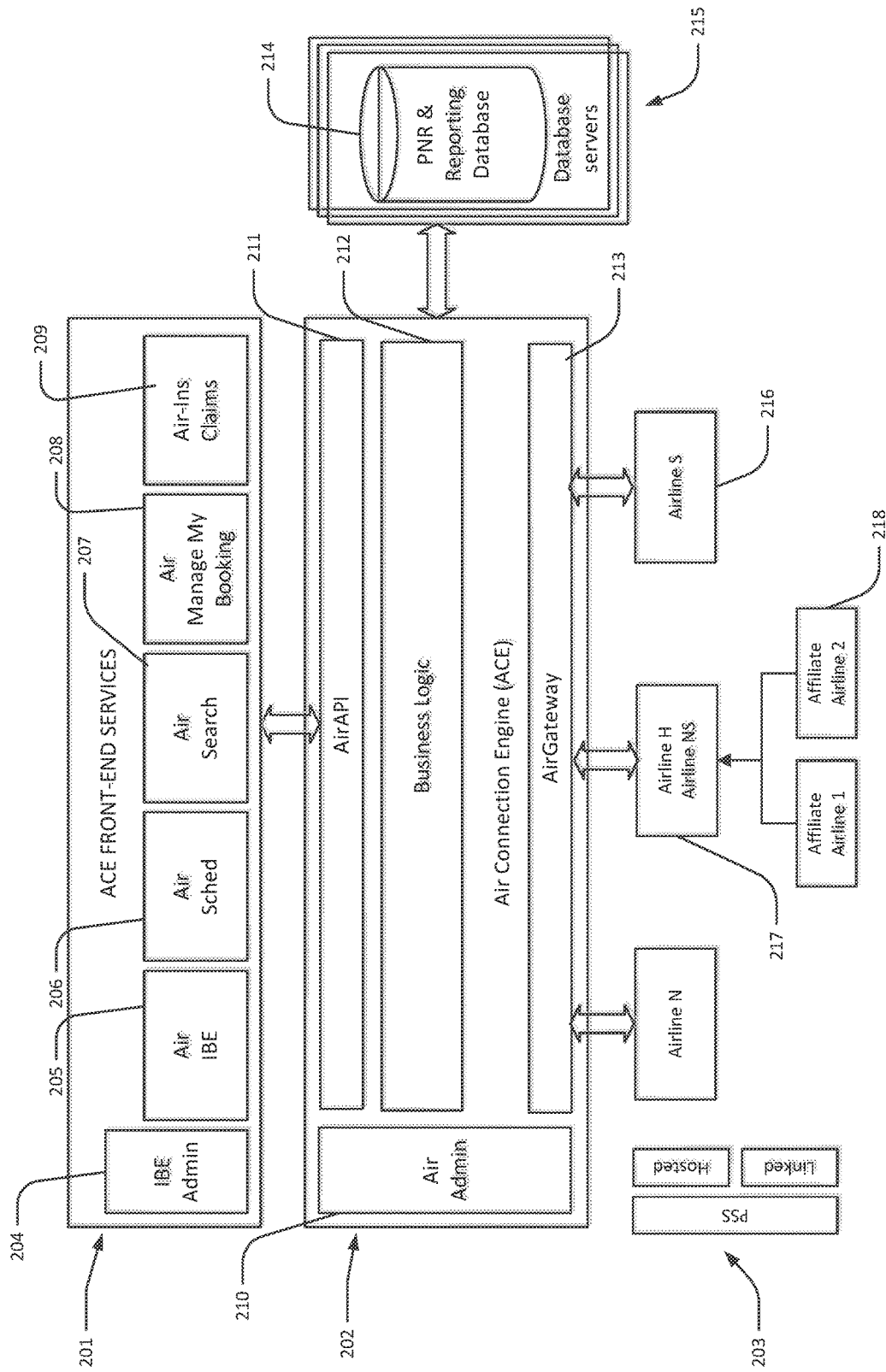
FIG. 2 shows a diagram of the disclosed Airline Connection Engine (ACE) components.

In various embodiments, the disclosed system provides single carrier interconnection and or multiple'carriers the capability for communicating travel product availability and pricing to a host airline by the disclosed Air Connection Engine (ACE). As shown in FIG. 2, the Air Connection Engine (ACE) 202 platform consists of the Air Connection Engine which connects to an extensible pool or community of hosts 216 217 218 forming the Passenger Sales and Service system 203 via the AirGateway 213. The ACE engine is responsible for interacting with and managing the hosts to provide browsing and booking services for the ACE Front-end Services 201. The ACE Front-end Services all communicate with the Engine via the AirAPI 211 and are controlled by the IBE Administration tool (termed AirAdmin) 204 configuration. ACE Front End services include the ACE Internet Booking Engine or AIR IBE 205, the air scheduler component AirSched 206, the search and meta data search engine AirSearch 207, the engine for booked passenger user interface interaction, ManageMyBooking 208, and the Air INSClaims component 209. A large set of extended or basic configurable logic instructions which may be customized and dynamically maintained in real time for each airline 212 controls interaction between the PSS sources 203, other sources of data at the airlines' volition such as schedule, pricing or browsing data, the passenger database servers 215 including the PNR and reporting database 214 and the ACE Front End Control and management of the various components is detailed below.

Figure 3:
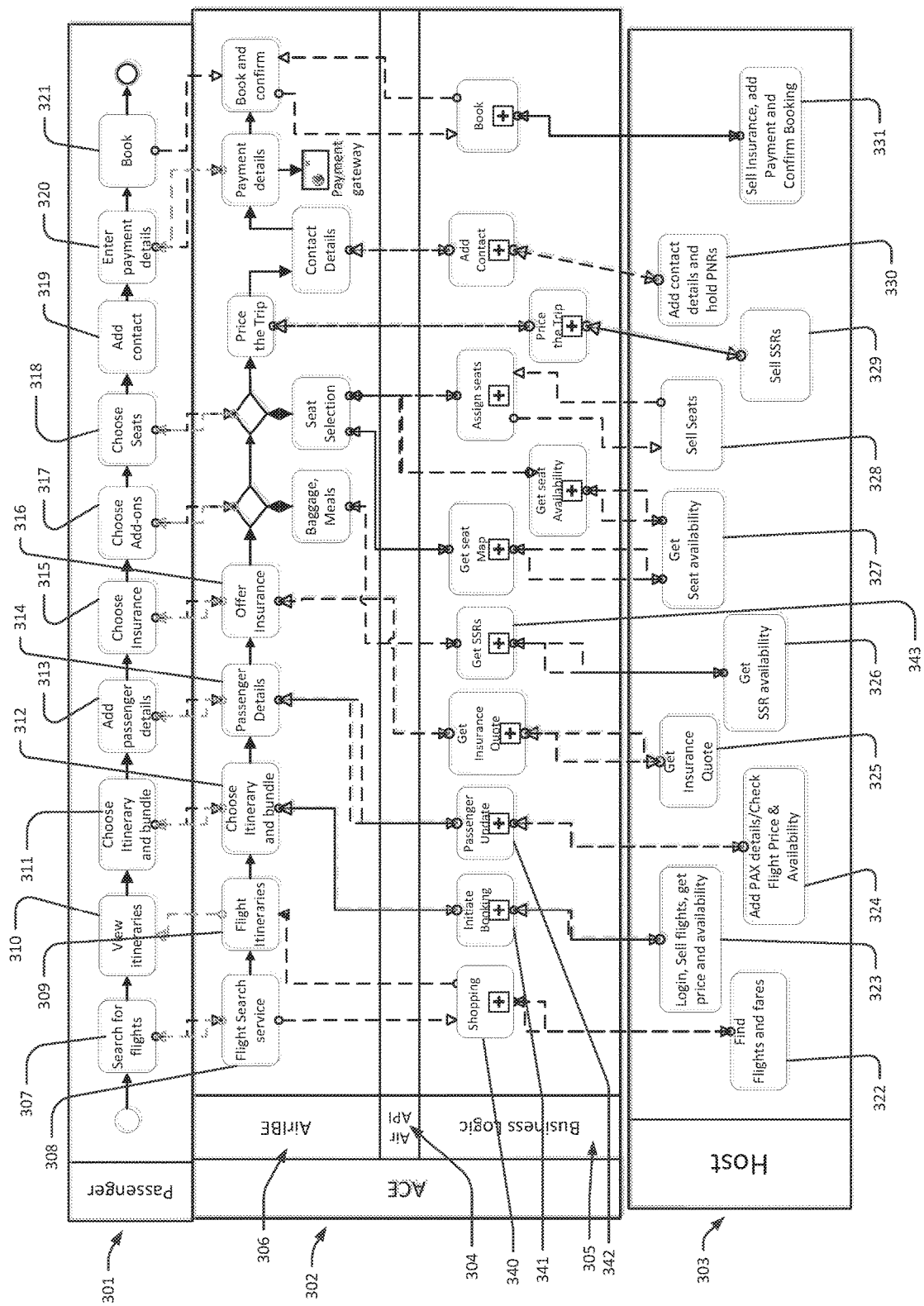
FIG. 3 shows a diagram of the disclosed passenger browse and book, workflow and interactions with the ACE and host servers for a single airline capable of holding a Passenger Name Record (PNR).

In FIG. 3, the swimlanes flow chart is shown which outlines an exemplar embodiment for a user airline browse and book process 301 and interaction with system backend services 302 and 303. This process flow covers the basic browsing and booking flow in order to show the primary end-to-end processes and interactions across the AirAPI 304 and the AirGateway boundaries. In certain embodiments, the browsing and booking processes are handled separately. Indeed, the ability to handle interactions in a discrete and separated manner allows the end consumer (such as a passenger) to start the transaction in one environment (e.g. mobile) and be completed in another (on the web via a browser). The process diagram shows a single airline model where the airline supports creation of a PNR which can be put on hold and built up by adding passenger details, SSRs, payments, etc. in separate interactions before finally committing. The ACE engine provides the capability for airlines to individually control the browsing and booking experience of their passengers through the utilization of a common backbone service. This management framework enables various workflows not constrained by the booking function. One of the unique features of ACE is that ABB is able to map and manage different workflows to the airline's branded normal environment. This flexibility allows the airlines to operate in various different modes that normally would not be enabled through the structure of their fixed host reservation system (PSS) or via the consumer's Web Browsers via the airline's Internet Booking Engine (IBE).

As shown, the passenger user experience begins by searching for flights from a user supplied origin and destination for a given date range 307. Other system inputs may be inferred from expressly supplied user inputs such as the location of the user, prior behavior or behavior according to a model that has been predetermined for inference. This information is passed from the user interlace through the ACE flight search service 308 which returns relevant results for the search according to the browsing configurable logic instructions module 340 which accesses real time PSS 322 and cached flight information. The browsing process is detailed below.

Next, according to the configurable logic instructions of various embodiments, the passenger is presented 310 with itinerary options which may include either bundled or component elements of travel products aligned between options available from various interlined itinerary segments 309. The system alignment of bundled travel products is detailed further below. The passenger then chooses the flight itinerary and bundle (which may be amended at any time during the workflow) 311 which in turn 312 initiates the booking process. In one enablement is that ACE permits a dynamic fare family (dynamically created bundle or product package) to be created in real time. This is rule dependent so that if 2 airlines are combining and one does not have a product that aligns with the other airline—ACE through rules can create a new fare family that enhances the "have not" airline with the functions or his partner irrespective of who is the selling/sponsoring branded airline. For example, if one airline has a premium cabin and the other does not, then the have not airline can still sell a premium cabin product which is created by ACE in real time and only when the condition exists for those particular aircraft and flight combinations. 341 and connects to the PSS 323 or an external surrogate for the PSS. After flight booking is initiated, passenger details are input through the user interface 313 and are added to the PSS service 324 according to the ACE passenger update configurable logic instructions 324. For airlines that offer, for example products and services that are not directly offered by the airline but through a third party such as flight insurance or a hotel overnight stay—which itself is configurable by route, city, person travelling, or by other configurable logic instructions, the system provides an interface for selecting these products such as the insurance 315 to the passenger and provides an insurance quote 325 which is communicated 316 back to the passenger. Additional travel add-ons or Special Service Requests (SSR) 326 which were not bundled with the flight options 343 are presented to the user for selection. Whether or not various add-ons or SSR's are included as part of a travel product bundle, are upsold to the passenger in a bundle, or are sold as an add-on subsequent to selection of a product bundle is configurable according to configurable logic instructions and independently of the airline brand. Through the interaction there is a large set of products and services both chargeable and not charged, to be offered by the airline to his customers. In various embodiments, a common internet engine provides an airline specific seat selection user interface 318 through the ACE system and PSS services for seat availability 327 and seat sales 328. While the engine itself sits inside the same platform—ABB's unique technology permits multiple IBE's to be presented. After seat selection in certain embodiments the passenger is provided an interface to allow additional contact information for itinerary notification 319 before being passed to the payment interface 320 which presents the user with the combined pricing for the itinerary, SSR's 329, seats 328, etc. and finally booking the passenger 331 and communicating the booking information to the passenger 321.

Figure 4:
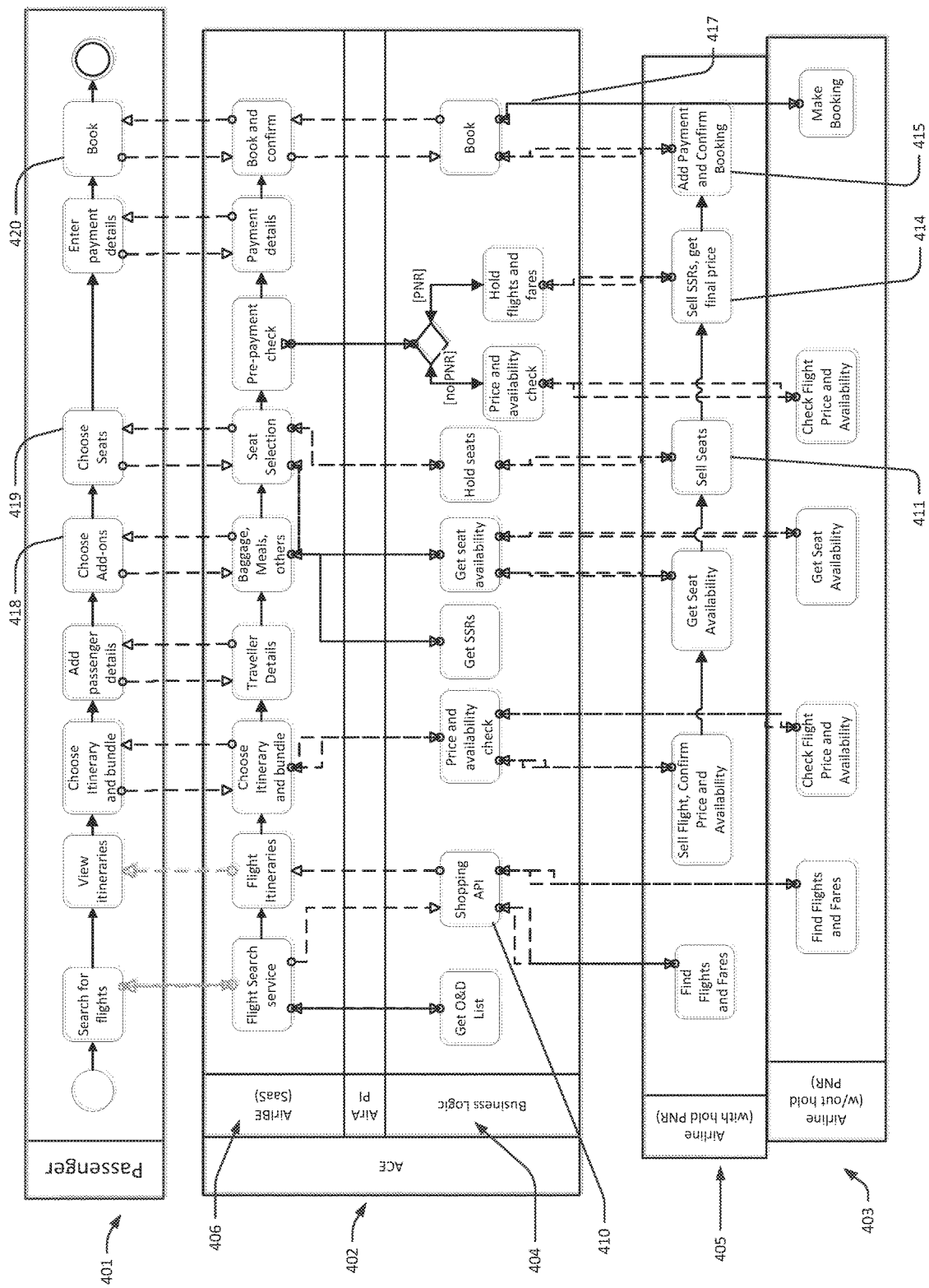
FIG. 4 shows a diagram of the disclosed passenger browse and book workflow and interactions with the ACE back end components and host servers for operating with airlines capable of a Passenger Name Record (PNR) hold as well as those without that capability.

In FIG. 4, the browse and book passenger driven workflow 401 is shown for an embodiment of the ACE system 402 including AirIBE 406 and airline defined configurable logic instructions, which may be inferred according to guidance provided by an airline brand rules. 404 for an exemplar circumstance when itinerary flight segments with disparate airline PSS systems, wherein one interlined airline PSS system allows PNR holds during booking 40 with a second airline for the second or additional flight segment that does not provide this capability 403. The disclosed ACE system provides such a capability through its implementation as detailed herein. The process diagram shows two airline models: one where the airline supports creation of a PNR which can be put on hold and built up by adding passenger details, selling seats 411, SSRs 414, payments 414, etc. in separate interactions before finally committing 417. The other model is where the airline requires submission of all the PNR elements in a single session/interaction. ACE services such as the Browsing module 410 query both (PNR hold and PNR no-hold) systems with the same API and integrate the query results processed by airline defined configurable logic instructions into a common data schema. The ACE system and management platform are not constrained to these 2 airline models. Any number of airline sectors and flight segments may be managed in a single workflow.

For airlines that support holding of the PNR, the flights, fares, add-ons and seat selection (where applicable) are secured prior to the user entering their payment details, allowing a confirmed final price to be provided to the user. The only remaining action to complete the booking is to then add the payment details and confirm the booking as the last step in the workflow.

For airlines that do not support holding of the PNR or elements from the partner, the flight selection, fares, add-ons and seat selection (where this is supported) are all completed and submitted as a single request or a collection of joined or non-joined requests at the end of the workflow. To minimize the possibility of failure to book due to a price variance threshold breach a pre-payment cheek is carried out after the user has entered all the passenger details, selected their add-on, and seats where relevant and just before they provide their payment details.

The ACE AirBooking function will be responsible for communicating with the user regarding the initial booking. Communications from any of the airlines included in the itinerary to the user at the time of booking should be suppressed as ACE will notify them of the booking status, booking, details and itinerary. However, subsequent changes to any of the airline segments in the itinerary, for example a schedule change to a flight, may result in the airline contacting the user directly themselves about that particular flight. The user may additionally be contacted by ACE about the itinerary as a whole if required, for example if the schedule change for one flight breaks the minimum connection time for the next flight. In various embodiments, the system interaction configurable logic instructions allow for either or both the system platform or the airline to perform this independently or interactively.

Figure 5:
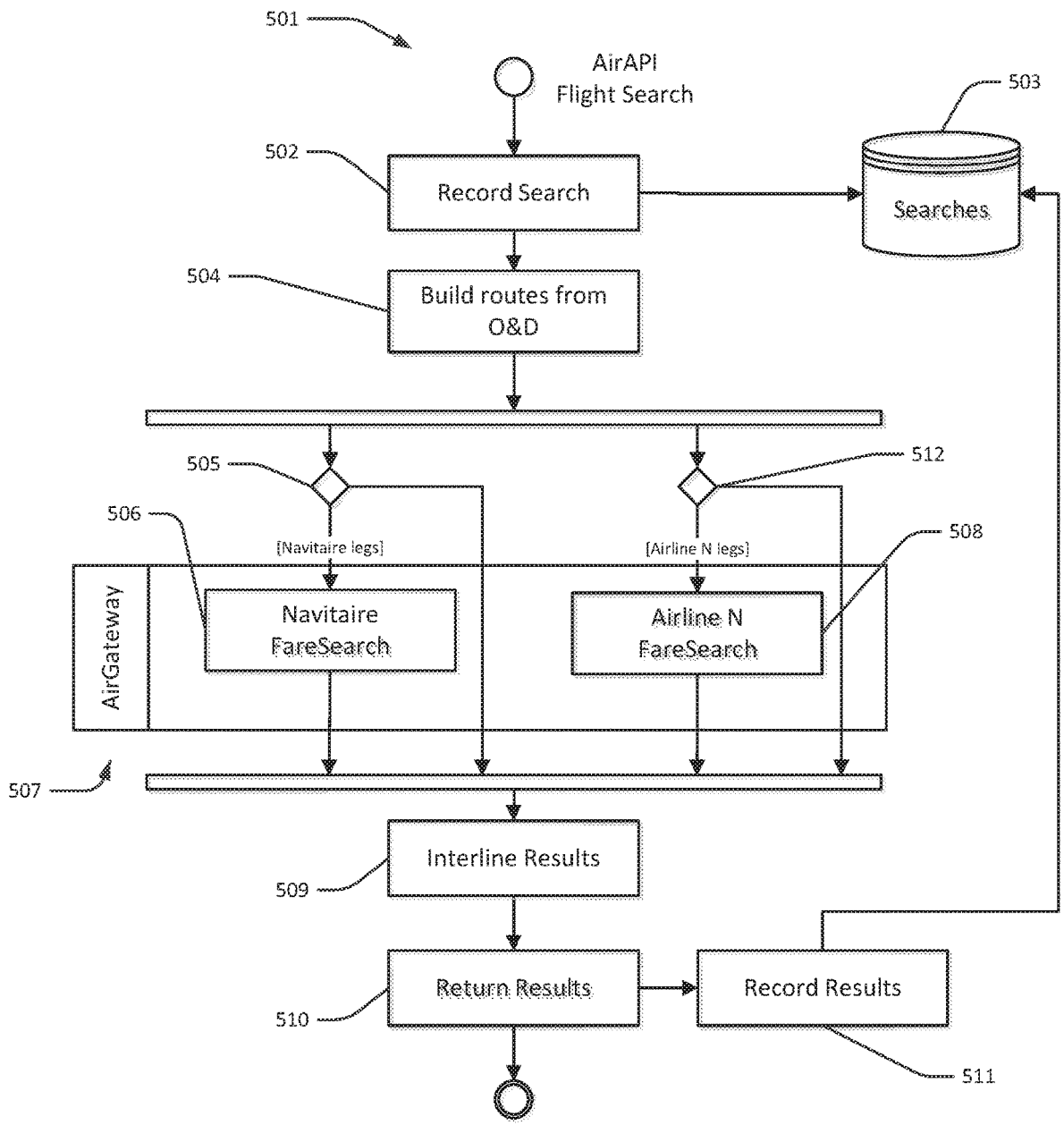
FIG. 5 shows a flow chart of an embodiment of the ACE flight search component.

FIG. 5 presents a flow chart 501 outlining the process for ACE browsing module travel product and flight searches for both PSS systems such as Navitaire sourced airline data, airline hosted data, and specialized third-party searches of airline data such as may be obtained through direct or indirect fares and pricing engines be they GDS or from such vendors as Google Flight Search (Matrix) services or Vayant services. Other third party browsing services may be incorporated such as the airlines service of companies such as Kayak, Skyscanner, WEGO or Quinar. The IBE requests flight availability and prices via a Fare Search request submitted over the AirAPI is common to these disparate systems and integrated by ACE.

A record of the search 502 is created in the Searches database 503 against a unique search id created for the client request. Initially this captures all the search criteria as well as when the search was made and where it came from. The results of the search will be added later in the flow 511. This data is retained for reporting and analysis by the airline or by ABB on behalf of the airline subject to the requirements of government regulation and always secure for the consumer's data.

Configurable logic instructions in AirSched/Smart Router determines the viable routes and the airlines required to service those routes driven by the rules for the Sponsoring Airline which include enforcement of airline and city pair include/exclude lists.

Configurable logic instructions 507 gets the search results from each of the airlines determined to be needed to service the request as described below.

For an exemplar third party system such as Navitaire hosts 506:
  An AirGateway FareSearchRQ request is made which results in the following interactions with the Navitaire host:
  Get Availability Request: Get a list of available flights and fares.
  GetItinerary Price: Using much of the data returned by the getAvailability Request to get pricing detail (Taxes, Fees, Surcharges, Infant SSRprice, etc.).
  Search results, with fares are returned together with the unique Journey key(s) and Fare Sell key(s) for each reservation.

For an exemplar airline host—Airline N 508:
  An AirGateway FareSearchRQ request is made which results in the following interactions with the Airline N host:
  GetAvailability Get a list of available flights and fares with a unique FareKey for each.
  Pricing: Send FareKey(s) of the selected flight(s) for pricing, detail (Taxes, Fees, Surcharges, etc.)
  Search results, with fares are returned together with the unique FareKey(s) for each reservation.

These are exemplar message types, ABB's ACE engine support can support other direct or ancillary message types—both explicitly requested and implicit.

The service is adapted and transformed from the NDC specification so that it may accommodate either a proprietary API interface or the generic industry ones including the OTA (open travel alliance standard. The ACE API and data schema allow for interlining these results 509. The browsing results are cached in order to provide better performance for the user. Therefore, the flight results may well be returned from cache rather than a direct interaction with the airline host(s). When interactions are required with the hosts, to populate the cache, it is expected that they will be serviced by a pool of browsing query gateway processes.

ACE records results, journey keys, fare keys, etc. (as appropriate) in the Searches database 503 against the search created earlier and returns results (but not the keys) to the client.

Figure 6:
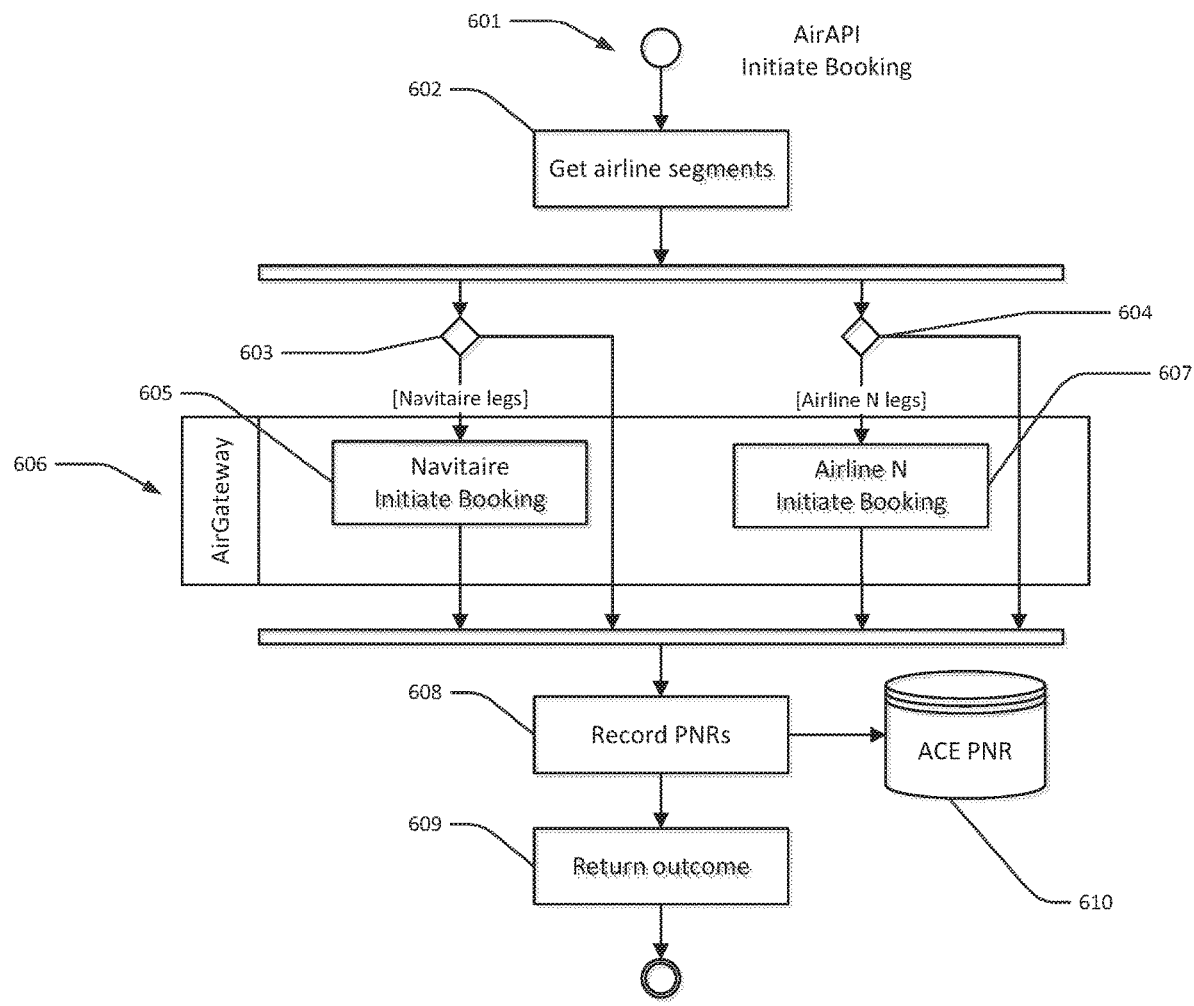
FIG. 6 shows a flow chart of an embodiment of the ACE initiate booking component.

Shown in FIG. 6 is the ACE Initiate Booking process module 601. After the user has chosen a specific itinerary and bundle and requested to make a booking, the IBE requests initiation of the booking workflow via an Initiate Booking request submitted over the AirAPI. This interaction establishes the availability and confirms the price of the fare(s) in the itinerary and holds these with the airline systems where this feature is supported by the host system.

The initiation of the booking creates a local temporary booking record in the ACE business layer into which the details of the booking will be recorded as they are provided by the user, the airline hosts and the ACE components. ACE build a master booking record that is a handoff from the search records. This is termed "booking" and the record is effectively a PNR for each airline that is built up as the user progresses through the booking journey and is used to fulfil each of the subsequent interactions with the airline host(s) in order to complete the booking. As details are added by the user (PAX details, SSRS, seats, payment) they are included in the temporary record and passed to the airlines via the AirGateway as required. For airlines that support this feature, at the point of pre-payment the hooking with the airline is put on hold pending payment. Once the passenger has confirmed the details the booking becomes a Super PNR but without the identifier. Then the airline (indeed all airlines in the reservation) will (each) allocate a PNR identifier which is then captured in the Super PNR booking in the ACE business layer. For airlines that don't support the feature of holding a booking pending payment the payment is captured and the PNR is allocated after payment confirmation. At the point of final confirmation, after the payment has been made and the booking with the airline(s) completed the temporary booking in ACE is converted into a live booking and an ACE super PNR ID is assigned 610. The Super PNR acts as a container for a copy of each of each of the airline PNRs. This also enables browsing cart recovery in the event of abandonment or communications interruption between the user and the various systems involved in this transaction flow. It also facilitates enhanced functions when we are dealing with post booking interaction through user or airline-initiated changes and managed through the consumer's own interaction with a self-service tool called "Manage My Booking". A professional mode version is also enabled.

The temporary booking record also captures additional information that is required to fulfil the booking process, such as:
  session references for the temporary bookings being constructed on the airline host systems
  journey leg and fare sell keys, etc. that are provided by the airline APIs and used as references in subsequent interactions
  IBE session ID's to correctly associate the booking with the user session including the information that may signify characteristics about the customer which can be used to personalize the offer to the customer.

The actions required for each airline in the itinerary are as follows:
  For Navitaire hosted systems. Note that Navitaire is a system PSS owned and operated by Amadeus. There are several other systems as well that ACE can support ACE can support different types of host PSS. For example a low cost PSS, or a Full Service Airline host such as Amadeus other product ALTEA or the SabreSonic system from Sabre.
    A local temporary PNR is partially created with the flight details pertaining to the airline's segment(s).
    A session needs to be established with the airline host and a temporary in state booking created. This is the airline's temporary PNR that will become an actual PNR if the booking is committed. An AirGateway PNRCreateRQ request is made which results in the following interactions with the airline host.
    Login: To establish a session that provides a signature that is used in subsequent interactions with the API.
    GetItineraryPrice: Using much of the data provided in the PNRCreateRQ (i.e. the data that was provided by the user in these flight search request and in the browsing getAvailabilityRequest) to get up-to-date pricing detail (Taxes, Fees, Surcharges, etc.).
    Sell: to establish the booking and hold space for the requested journeys.
    The login session id (which will be required for subsequent interactions) and the fare details that have been held by the host are returned.
  For exemplar airlines—Airline N 607:
    A local temporary PNR is partially created with the flight details pertaining to the Airline N segment(s).
    A temporary 'in state' booking needs to be, created with Airline N to confirm the availability and price, hold the fare and establish a price for the travel insurance. This is Airline N's temporary PNR that will become an actual PNR if the booking is committed. Note that the booking may be incomplete for different reasons such as car abandonment in which case the PNR (without the Record Locator) is washed away and the state returned to that which existed before. An AirGateway PNRCreateRQ request is made which results in the following interactions with the Airline N host:
    Pricing: Using the data provided in the PNRCreateRQ (i.e. the data that was provided by the user in these flight search request and in the browsing getAvailability request) to get up-to-date pricing detail (Taxes, Fees, Surcharges, etc.) That pricing can come from not jug the airline system but also 3rd party systems as authorized and approved by the airline including having ACE calculate the price.
    Sell: to establish the booking and hold space for the requested journeys. This also returns one-way, per PAX the travel insurance price which needs to be returned to the configurable logic instructions layer. It calculates the insurance for all sectors of the itinerary. It does not distinguish between the sectors or parts of the journey, i.e. a consumer should be able to buy insurance for the whole trip.
    The fare details that have been held by the host and the insurance price quote are returned.
    The PNR details, session ids, journey and fare sell keys, insurance quote (for Airline N) etc. are recorded in the temporary booking and the outcome returned to the client.

Secure sessions created with (exemplar Navitaire based) hosts will remain in state and will 'hold' the flights, SSRs and Seats that get sold during the session. If the user abandons the booking midway through the session (whether intentionally or because they lost their connection for example) the system should clear and logoff the session in a similar way, it would after committing the booking if everything went well. Airline N requires similar session management for exceptions, but does its own session tidy up after completing a booking normally. A process needs to be provided to kick-in if the user has not completed the booking within a configurable time period. This process will also tidy up the temporary booking record created by the configurable logic instructions to support the building of the PNRs.

Figure 7:
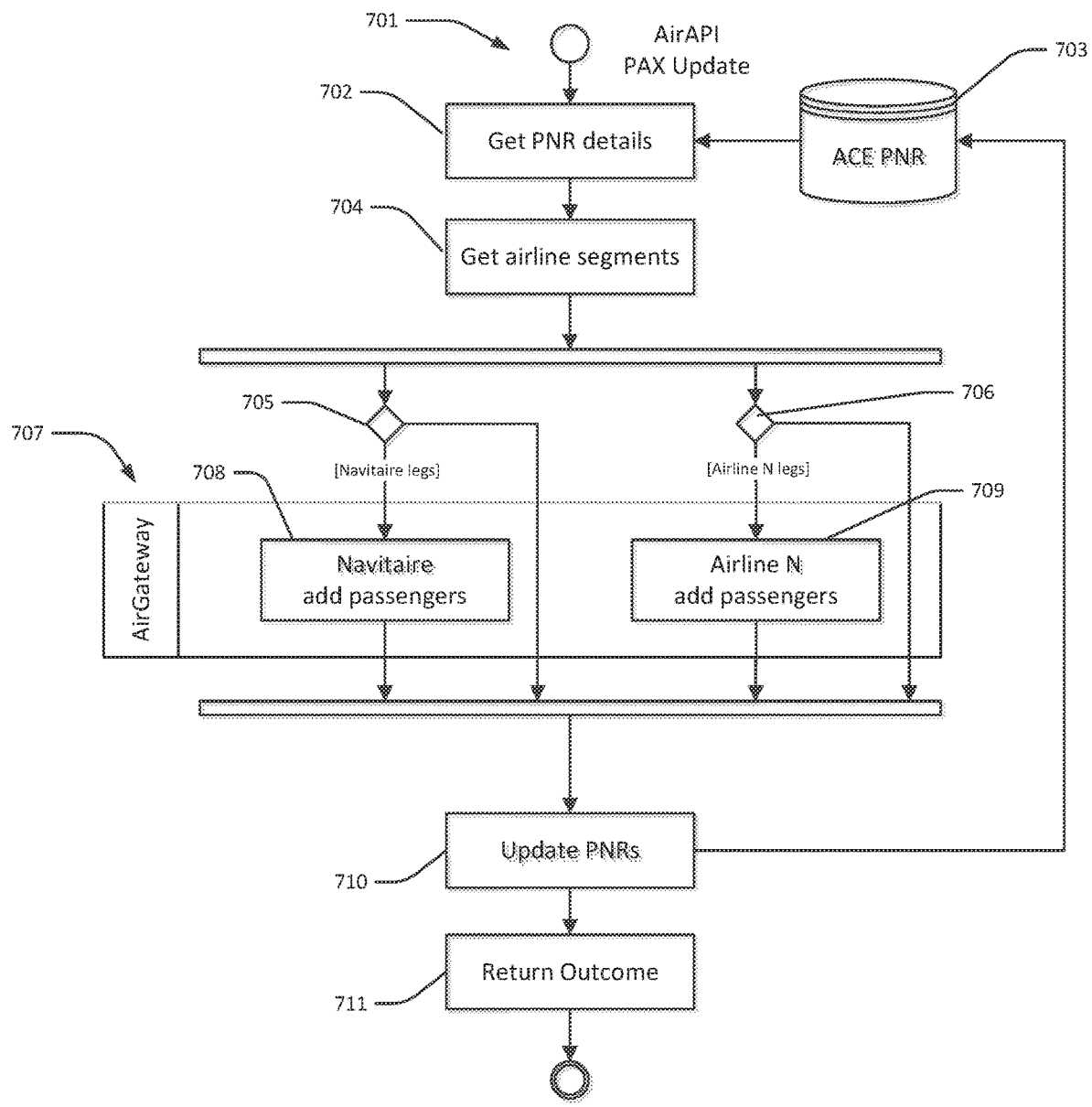
FIG. 7 shows a flow chart of an embodiment of the ACE passenger record update component

FIG. 7 shows a flow chart of the passenger (PAX) information 701 update during the booking process, including the PNR. The passenger update activity captures the passenger details and where supported records these in the airline's temporary PNRs. Doing so at this stage reduces the impact of errors at the later pre-payment stage and allows belter interaction with the user. As shown in the flow chart, the process retrieves PNR details 702 from the ACE PNR database, 703, then retrieves the chosen airline segments 704. The process then splits between Navitaire 708 and other Airline PSS hosted 709 records in the AirGateway module 707. For both shown process paths, a third-party search service such as Google's Flight Search (previously ITA) or Vayant may be utilized to search the Airline records, bypassing the AirGateway search process. As a final step, the PNR is updated 710 and the search results are service results are retuned 711, In various embodiments, IBEs may or may not permit changes to the PAX types during the booking workflow i.e. the user cannot add or remove a passenger or change a child to an adult for example. If the embodiment OBW does not support PAX update, the user must return to the fare search and start again if they wish to change the PAX make-up of the group.

To support changing of PAX types during the booking workflow, the embodiment process is extended to include interactions with the hosts to check flight prices and availability, as such some changes are likely to affect the itinerary price and potentially the fare availability.

The IBE requests to update the passenger details via a PAX Update request are submitted over the AirAPI. Configurable logic instructions takes the passenger details and processes them as follows:

For Navitaire hosts. An AirGateway PNRCreateRQ request is made which results in the following interactions with the host: The UpdatePassengers module is used to add the passenger details to the in-state booking.

Airline N:

An AirGateway PNRCreateRQ request is made which results in the following interactions with the Airline N host:

UpdatePassenger: to update the traveler details.

Figure 8:
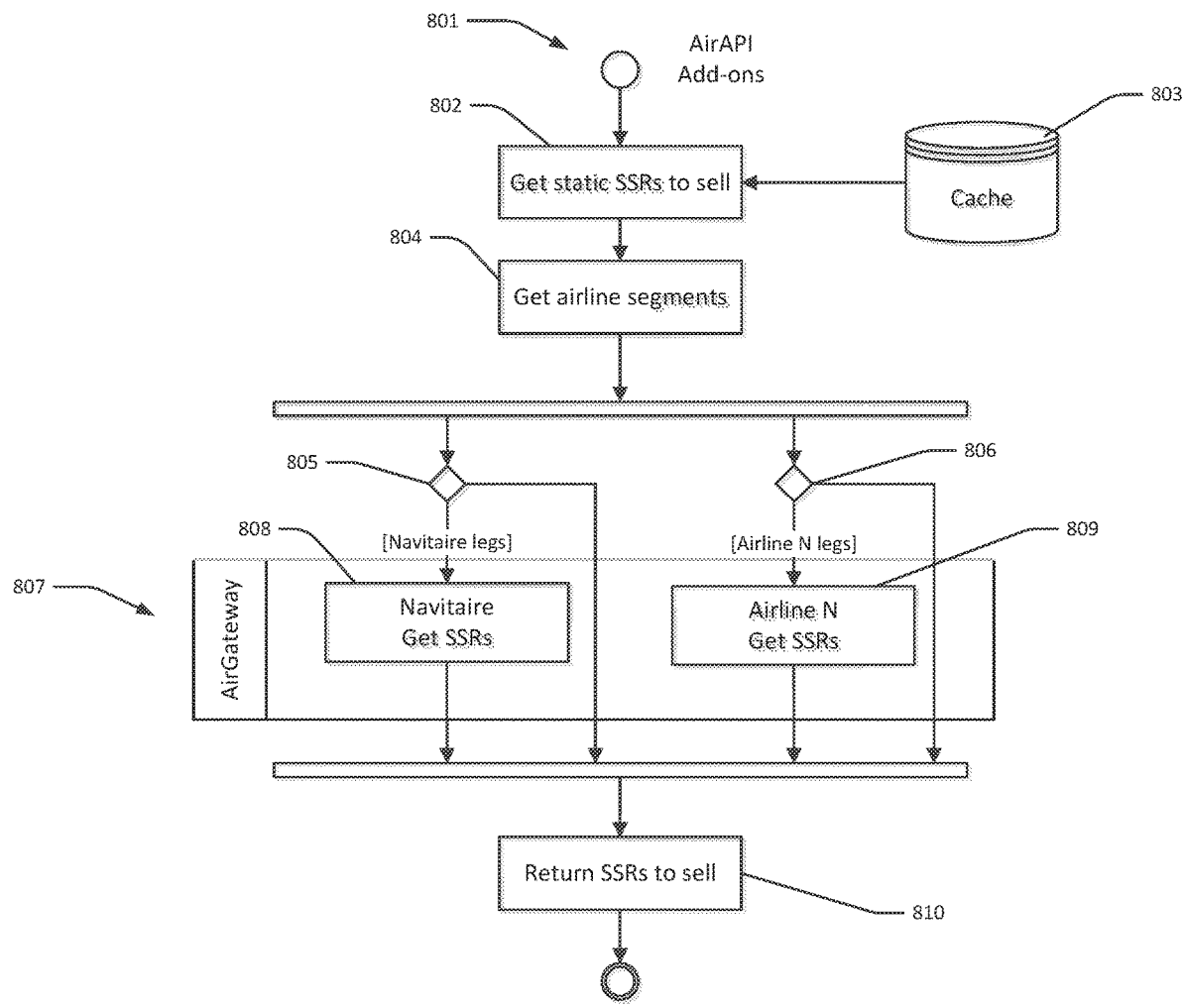
FIG. 8 shows a flow chart of an embodiment of the ACE passenger add-ons component.

In various embodiments the relevant SSRs are retrieved for presentation to the passenger. An embodiment of the process 801 is shown in FIG. 8. For this service, the IBE requests SSR availability and prices via a Get SSRs request submitted over the AirAPI.

For non-inventory, specific: Configurable logic instructions gets the static, non-inventory controlled SSRs 802 from the local cache 803 for the airlines in the itinerary as described below:

For various airline embodiments: Non-inventory related SSRs should pick up the price from the local cache 803 and the description that is configured for that SSR code by the Sponsoring Airline Navitaire 808, airline hosted 809 and third party (Google Flight Search, Vayant) 805 806 are processed in the AirGateway module 807. Results are communicated to the passenger 810.

For other Airline embodiments: checked-in baggage codes should pick up the price from the local cache and the description that is configured tot that SSR code by the Sponsoring Airline. ACE has a separate sub system called AirMSS, this enables a 3$^{rd}$ party public or private Server to serve up either the content or point to it.

The additional checked-in baggage codes (BT05-BT25) are priced in local or US dollars with an international flight price and a domestic flight price for each code and currency, For Inventory Specific SSR's configurable logic instructions gets the inventory controlled SSRs for the airlines in the itinerary as follows:

For Navitaire hosts: an AirGateway ServiceListRQ request is made which results in the following interactions with the host:_The GetSSRAvailabilityForBooking is called—Using the leg key(s) retained from the get availability request for the airline's legs of the selected itinerary.

For SSRs that have limited availability by leg the availability of the SSR needs to be determined from the SSRLid and SSR Sold values. If the SSRLid value is zero or the SSR Lid value minus the SSR-Sold value is zero, then the SSR cannot be sold.

For checked-in baggage: The AirGateway will return the SSRs offered according to getSSRAvailability. ForBooking with the price that varies dependent upon the package chosen (e.g. Fly, FlyBag, etc.) Configurable logic instructions will determine which of these to filter out and discard. A price of $zero indicates the SSR is included in the fare, but there may be multiple of these, so the higher value should be used e.g. if BG15 and BG20 are both $0 then use BG20.

Baggage details need to be gathered by journey leg as baggage needs to be matched across interlined segments.

Meals: The AirGateway will return the SSRs offered according to getSSRAvailabilityForBooking with the appropriate price for each. Meal details need to be gathered by leg as they pertain to a specific leg of a segment.

The scope of other SSRs varies (leg, segment, journey leg or itinerary) and details of the scope are available in the SSRCatalogue. Various embodiments include a hosted database of SSR that is managed by ACE or handled externally For other Airline embodiments, additional rules must be implemented when interlining checked-in baggage. As an example, Airline S may have an interlining agreement with their affiliates Airline N or Airline H Airline S provide a fixed weight of 20 kg, which cannot be changed. In this case, the alternate airline embodiment and other partner flights may have a ceiling weight of 20 kg. If they offer 20 kg included, then their value can be fixed at this level. If 20 kg is a chargeable addition, then it should be selected by default but the user given the choice to lower it if required e.g. if a partner only includes 15 kg and offers a 5 kg increase fora fee, then 20 kg+fee should be the default with the possible option to change it to 15 kg or retain the fixed amount of baggage at 20 kg. Whichever option is selected the passenger's entire journey is configured automatically to have the compliant weight for all the airlines within that journey.

In these alternative airline embodiment, if interlining with their affiliate Airline T, the selected weight must be matched between the Airline S and the affiliate flight(s), so control over selection of weight should be permitted for the Airline S flight and whatever is selected must be mirrored in the affiliate flight(s).

In these alternative airline embodiments, for meals, the configurable logic instructions need to determine the correct descriptions to return. These change periodically and should be taken from a local table refreshed by import from Airline S based on the SSR code. The descriptions for premium and vegetarian meals vary per leg and therefore need to use a combination of the SSR code and the route. The meal category (Hot Meals, Light Meals, Premium, etc.) are determined from the SSR nest code.

In these alternative airline embodiment, seat prices are retrieved from the API. The seat prices will vary according to the selected bundle e.g. for the Flex bundle the seat prices will be zero as choice of seat types is free of charge for this bundle.

In these alternative airline embodiments, infant SSRs (INFT) are inventory specific so availability must be checked, for security purposes while an infant is not occupying a seat the airline needs to account for "souls on board" particularly in security related instances such as checking passports. The ACE engine automatically calculates this information whether the infant occupies a seat or not. Non-availability on any of the segments invalidates the itinerary and must be notified to the user in these alternative airline embodiments, the service charge is a fixed fee per infant per segment. An infant and the associated price is added to a booking via the SSR code INFT being attached to one of the adult passengers. If an infant PAX type is included in the journey, then the INFTSSR code provides the price for the infant. The resulting price, summed for all in these alternative airline embodiments, and converted (if required) to the currency of the itinerary Point of Sale can be included in the itinerary price. The special arrangements for Infants are important to enable the airline to report the total number of passengers on board whether or not they are occupying a seat.

In these alternative airline embodiments, Go Connect is an SSR(XCF) that is added per PAX, per Segment. It only applies for connections via various airlines where both arrival and departure are alternate airline carrier flights and it must be added for all applicable connection flight segments on each PAX. XCF may be free of charge. The charge is included by the fee code being automatically added to all applicable connection flight segments on each PAX.

In these alternative airline embodiments, the priority check-in SSRS (XCKN and XCK0) come bundled with the selection of the branded seat upgrade. If one PAX selects a particular branded seat upgrade, then all PAX get the priority check-in. The SSR is added just to the alternate cattier segment departing from its hub using the SSRC code XCKN for the first PAX in the booking and XCK0 for each remaining PAX.

In various embodiments, bundled SSR's are processed for example when the Flex bundle (product class=F2) has been selected for an alternate airline journey the following SSRs may be automatically added to the PNR to ensure that the bundled services are received: PB30 (Pre-order Baggage 30 KG) and XCK0 (Priority Check-in without Charge), both attach to each Passenger of the "Flex" segment(s).

In these alternative airline embodiments baggage details need to be gathered by journey leg as baggage needs to be matched across interlined segments.

In these alternative airline embodiments for checked-in baggage the process is: promotional and discounted product class level bundles come with 15 kg included and with a product class with 20 kg included. Alternate carriers may in certain embodiments have an agreement that the primary carrier will increase the included 15 kg weight for promotional and discounted product class level bundles to 20 kg to align with (Airline S) when they are interlined. So, if an (Airline N) segment is sold by Airline S (i.e. Airline S is the Sponsor) and it is included with an Airline Segment that includes a bag (i.e. all except Fly bundles) then the Airline N segment will include 20 kg for free. To indicate this the SSRBXF is added (automatically by Navitaire) to the Airline N segment. Additional weight selected by the user over and above 20 kg will require adding the appropriate SSR code BTnn e.g. BT05, BT10, etc. to make up the weight from the included weight.

In various embodiments, the configurable logic instructions determine whether SSRs are gathered all together or separately by category, for example all the baggage SSRs separate from the Meal SSRs, separate from the other SSRs. The calls to the AirGateway will be constructed to suit the configurable logic instructions and to take into account performance and efficiency for servicing the AirAPI/IBE.

In various embodiments, the 'per passenger' and 'scope' attributes of the SSR (as documented in the SSR Catalogue—whether stored internally as part of AirADD or externally through and AIrMSS compliant data source) are important as they determine how the SSR is sold to the user. The 'scope' determines whether the SSR is offered: insurance is an example of an SSR with itinerary scope. For each Journey Leg i.e. segments that have been interlined. Baggage is an example of an SSR with journey leg scope. For each segment i.e. legs with a common flight number. Seats are an example of an SSR with segment scope.

For each leg. Meals are an example of an SSR with leg scope. per passenger' indicates whether the SSR is offered and sold on a per passenger basis or for the booking. For example, baggage and meals are sold per passenger whereas an extra empty seat is sold on a per booking basis.

In various embodiments, interline restrictions may apply. In various embodiments, some restrictions on SSRs need to be enforced when interlining flights from different airlines. For example, a carrier may have a ceiling of 30 kg for check-in baggage. So, if a journey includes a HK Express segment then all other segments in the journey must be limited to a maximum of 30 kg. The rule is that the lowest maximum weight for a single segment in a journey is applied to all segments in that journey i.e. all segments in the journey adopt the lowest common denominator.

In various embodiments, additional information may be needed and is requested by an after-sale message. Some SSRs carry additions (airline configured) information messages that need to be displayed when the SSR is sold, for example on selecting a WiFi add-on the message informs the user that a userid and password will be emailed to them prior to the departure date. Any additional information messages are returned with the SSR details so that they can be displayed to the user on selection of the SSR and also included in the booking confirmation details displayed and emailed after the booking is completed.

In various embodiments, certain SSRs are not selected by the user. In various embodiments, some SSRs need to be added to the booking based on airline configurable logic and settings. For example, if any of the passengers are of type infant then an infant in lap SSR needs to be added to the booking for airlines configured to require infant SSRs. An INFTSSR code must be added for various carrier bookings but nothing needs to be added for other carriers.

In various embodiments, SSR specific rules and logic apply. For example, the specific SSRs supported by each airline and their rules are defined in the SSR Catalogue spreadsheet together with the attributes (scope, per passenger, etc.) of the SSRs. The additional spreadsheets provided by the airlines may include meal details and ancillary spreadsheet may be available in the design model.

Figure 9:
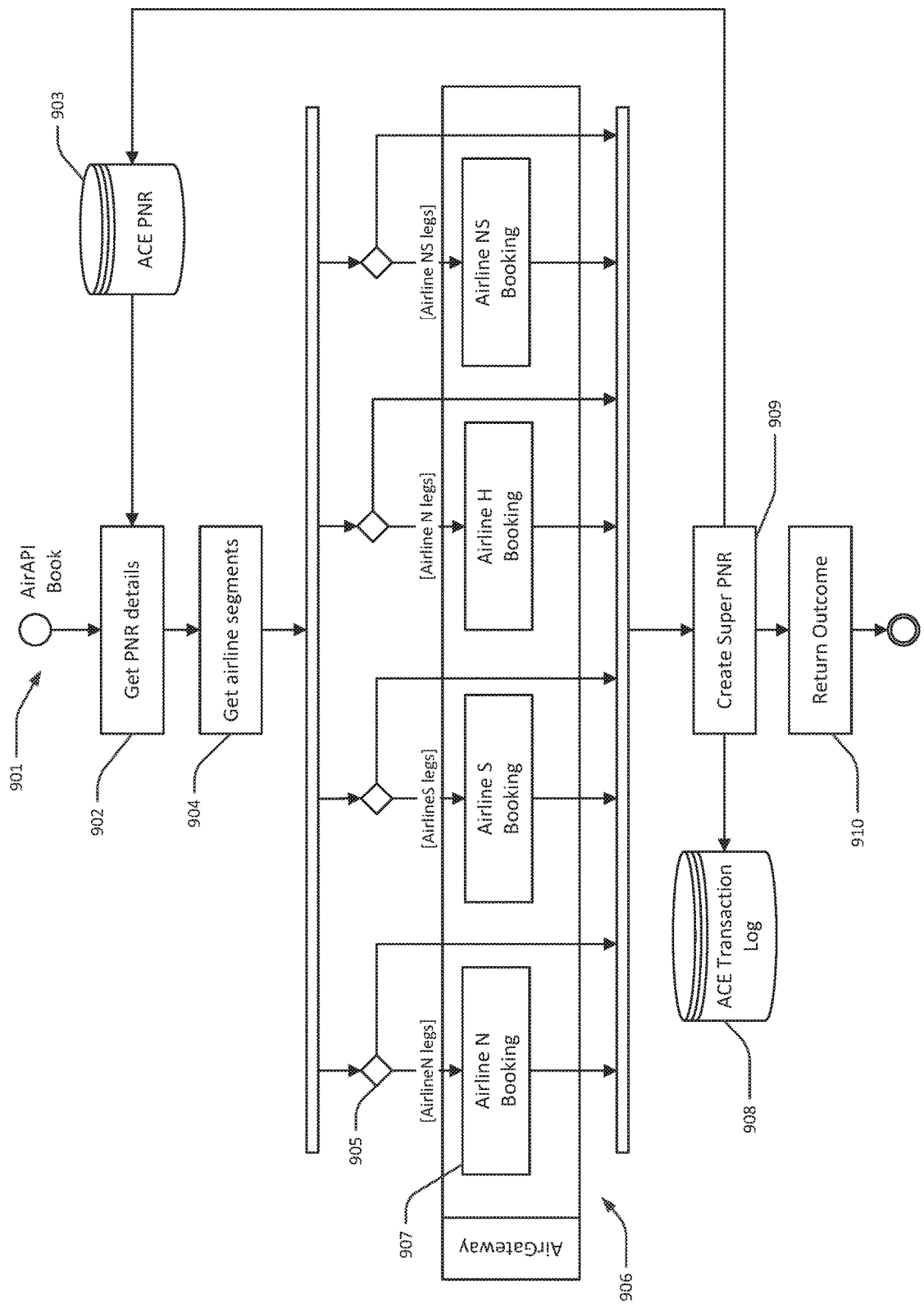
FIG. 9 shows a flow chart of an embodiment of the ACE booking component.

Shown in FIG. 9, the book activity process 901 provides payment details and requests the final confirmation of a booking with the host(s)—either creating the host PNRs or turning the host PNRs from a held to a confirmed (live) status. In general, the process begins by retrieval of the PNR 902, then retrieve the airline segments 903 before utilizing the relevant airline hooking system 907 or third party sources 905.

The specific behavior for this post payment flow can vary significantly from host to host in line with the varied behavior of the pre-payment and payment gateway flow. For example, if the host pre-payment actions were to put the in-state PNR on hold pending payment and for the payment gateway to simply confirm authorization of payment then the purpose of this flow is to:
- add the payment details
- add General Remarks detailing the full itinerary
- for the Sponsoring airline—add a General Remark to the PNR detailing the total itinerary price, the other airline(s) payment amount and the connection charge amount
- add a General Remark detailing user information
- submit the PNR for confirmation
- establish that the payment has been authorized and the booking completed
- return the confirmed booking details and fare rules for the PNRs created with the airline(s)

In various embodiments, if the host does not support in-state PNRs and therefore the pre-payment actions were simply to establish a final price for the booking, then the purpose of this flow is to:
- get the availability and prices of the flights and SSRs
- sell the flights and SSRs
- add traveler and booking contact details
- add the payment details
- for the Sponsoring airline—add a General Remark to the PNR detailing the total itinerary price, the other airline(s) payment amount and the connection charge amount
- add General Remarks detailing the full itinerary
- add a General Remark detailing user information
- submit the PNR for confirmation
- establish that the payment has been authorized and the booking completed
- return the confirmed booking details and fare rules for the PNRs created with the airline(s)

In various embodiments, any segments in the itinerary falling into this last category have a higher potential for failure and should therefore be processed before segments that have been held by their respective airlines. See the error and exception handling procedures for details as to how such errors will be handled.

In various embodiments, the amount applied in the payment segment of the PNR is the ticket price (base fare plus add-ons, plus taxes and fees) and is in the currency of the airline's first segment departure city*. This may not be the same currency as the POS for the whole itinerary.

In various embodiments, the IBE requests to perform a booking confirmation via a Book request submitted over the AirAPI. Configurable logic instructions take the Payment details that have been provided and confirmed by the payment gateway and processes them as follows:
- In various embodiments, an AirGateway PNRCreateRQ request is made which results in the following interactions with the Airline S host:
    - GetBooking: to retrieve the booking based on the airline record locator and put it in-state.
    - TravelCommerceSell: To sell the travel insurance if Airline S are the Sponsoring airline and the user has chosen to include personal travel insurance as per the quote from the Travel Commerce insurance quote. Note: the invocation of this request will cause and airline host PSS system such as Navitaire to add the relevant (INS) SSR to the in-state PNR, so there is no need for ACE to add the insurance SSR code to the PNR.
    - AddPaymentToBooking: to add the payment details to the in-state booking:
    - Add general remarks detailing the full itinerary to the in-state booking (see "Adding remarks to the PNRs" below).
    - In various embodiments, the Sponsoring airline may add a general remark detailing the other airline and connection charge payment details to the in-state booking.
    - Add a general remark detailing user information.
    - BookingCommit: to confirm and finalize the booking.
    - If the Airline S ticket includes at least one of the WiFi SSR codes (WF01, WF03 or WF24) then the carrier PNR needs to be added to the WiFi Booking Queue (QueueCode="WIFI") by calling the CommitBookingQueue method of the QueueManager. Only one entry on the queue per PNR, regardless of the number of WiFi SSRs in the booking.
    - GetFareRules: to get the fare rules for the ticket so that these can be returned for viewing.
    - GetPostCommitResults: to confirm that the booking has been processed and payment accepted by the host. This check is repeated until payment is confirmed or the repeat limit is reached.
    - GetBooking: to retrieve the confirmed booking.
    - Clear: to clear the booking in state from the session.
    - Logout: to log out and close the session.

In various embodiments, an ACE Super PNR 909 is created using the super PNR record locator allocated prebooking. The Super PNR bolds each PNR of the airlines. It also holds the details and breakdown a the connection charge which does not automatically appear in the airline PNRs. Thus, ABB's ACE has to generate the detail and then act on it. This is done automatically. The record is stored either in the full normal area of price in the PNR OR in the comment field of the airline PNR, IE as a comment in both the Sponsoring Airline's and the Partner Airline's PNR. A record will be created in the ACE transaction log 908 for the booking. This will be used by the financial reporting processes. Finally, the outcome of the booking is returned to the client 910.

In various embodiments, during the booking the system may use the general remarks to add booking (super PNR) detail into the individual airline PNRs. Full itinerary details will be added to each PNR to inform the airlines of the passenger's connections and total journey details. When necessary, ACE will closely follow the Passive segment format or hold the information in a memo or information segment that can be read by any user of that airline's host system, when constructing these remarks as these are a temporary/alternative solution to actually adding passive segments.

In various embodiments, just for the Sponsoring airline's PNR, payment details will be added to detail the ticket prices of each of the partner PNRs in the booking and the connection charge (total and break down of each element).

In various embodiments, user information will be added to each PNR to capture information about the IBE, ACE platform, user's IP address and browser type.

In various embodiments, full itinerary remarks include various fields. There will be a separate remark for each segment of the trip. The format of each remark is: Itinerary <seq> <type> <XX> <text>
- <seq> is the sequence number of the segment
- <type> is 'Air'
- <XX> is the airline code
- <text> is the details of the segment made up of: <Flight NO><Class><Date><Origin><Destination><Status Code><No of Seats>/<Departure and Arrival Time>/<SuperPNR Record Locator>/<airline Record Locator>/<airline booking reference>
- <Class>=cabin class code e.g. Y for Economy or C for Business
- <Status Code>='AK'

In various embodiments, to make interpreting the itinerary and to help identify the elements of data in the itinerary string a comment string giving the element descriptions should also be included as the first comment—to act as a header. The header string is: "no/type/Airline/Flight No/Class/Date/Orig/Dest/Status/Seats/Dep-Arr Time/SuperPNR/airline PNR/airline Ref". for example: no/type/Airline/Flight No/Class/Date/Orig/Dest/Status/Seats/Dep-Arr Time/SuperPNR/airline PNR/airline Ref Itinerary 1 Air TZ TZ123 Y 20JUL SIN DMK AK 2/11501400/ABC123/DEF456

Itinerary 2 Air XW XW789 Y 20JUL DMK NKG AK 2/20102320/ABC123/GHI789

Itinerary 3 Air XW XW345 Y 28XDL NKG DMK AK 2/10451410/ABC123/GHI789

Itinerary 4 Air TZ TZ456 Y 29JUL SIN DMK AK 2/08501140/ABC123/DEF456

In various embodiments, full payment detail remarks include the following fields and controls: There will be a one remark holding details of the payments for the full trip. The format of the remark is: Payments <PNR n>/<Connection Charge>
- <PNR n> repeated for each PNR in the booking this provided the total ticket price for each partner PNR, in the currency they quoted. The format is: <XX> <price> <currency> where <XX> is the airline code, <price> is the total ticket price and <currency is the currency for the price.
- <Connection Charge> is made up of: 'Connection charge in' <currency> 'total' <total>/<ABB charge>/<ABB charge>/<Currency adjustment charge>/<DCC charge>

For example, <text> TZ 875.54 SGD/DD 4875.46 THB/ Connection charge in SGD total 17.15/1.87/10.13/5.15/0 </text>

In various embodiments, user information remarks are included. In various embodiments, there will be a one remark holding details of the IBE, ACE platform, user's IP address and browser type. As this remark is only to be used for the airline's own internal systems (rather than third party ground handling systems for example) the normal limitations in length and format are not applicable.

In various embodiments, the format of the remark is: USERINFO: IBE Version: <AirIBE version>, API Version: <AirAPI version>, Gateway Version: <AirGateway version>, User IP: <IP>, Browser: <user agent>
- <IBE version> The version of the build for the IBE used to make the booking e.g. 0.4.25.
- <AirAPI version> The version of the build for the Air API used to make the hooking e.g. 0.4.9 dee6cd45.
- <AirGateway version> The version of the build for the AirGateway used to make the booking e.g. 0.4.5.
- <IP> the IP address of the user
- <user agent> the user agent string, of the browser/device used to make the booking For example, USERINFO: IBE Version: 0.4.25, API Version: 0.4:9 dee6cd45, Gateway Version: 0.4.5, UserIP: 115.66.183.13, Browser: Chrome, Platform—WinNT, User-Agent—Mozilla/5.0 (Windows NT 6.3; WOW64) AppleWebKit/537.36 (KHTML like Gecko) Chrome/46.0.2490.86 Safari/537.36 ABB stores this information for use not just by the machine but for human interaction later. In some cases, users claim certain behaviors by the system but our unique ability to track the entire transaction from start (shopping) through to conclusion makes, it a valuable tool in the case of customer dispute.

Figure 10:
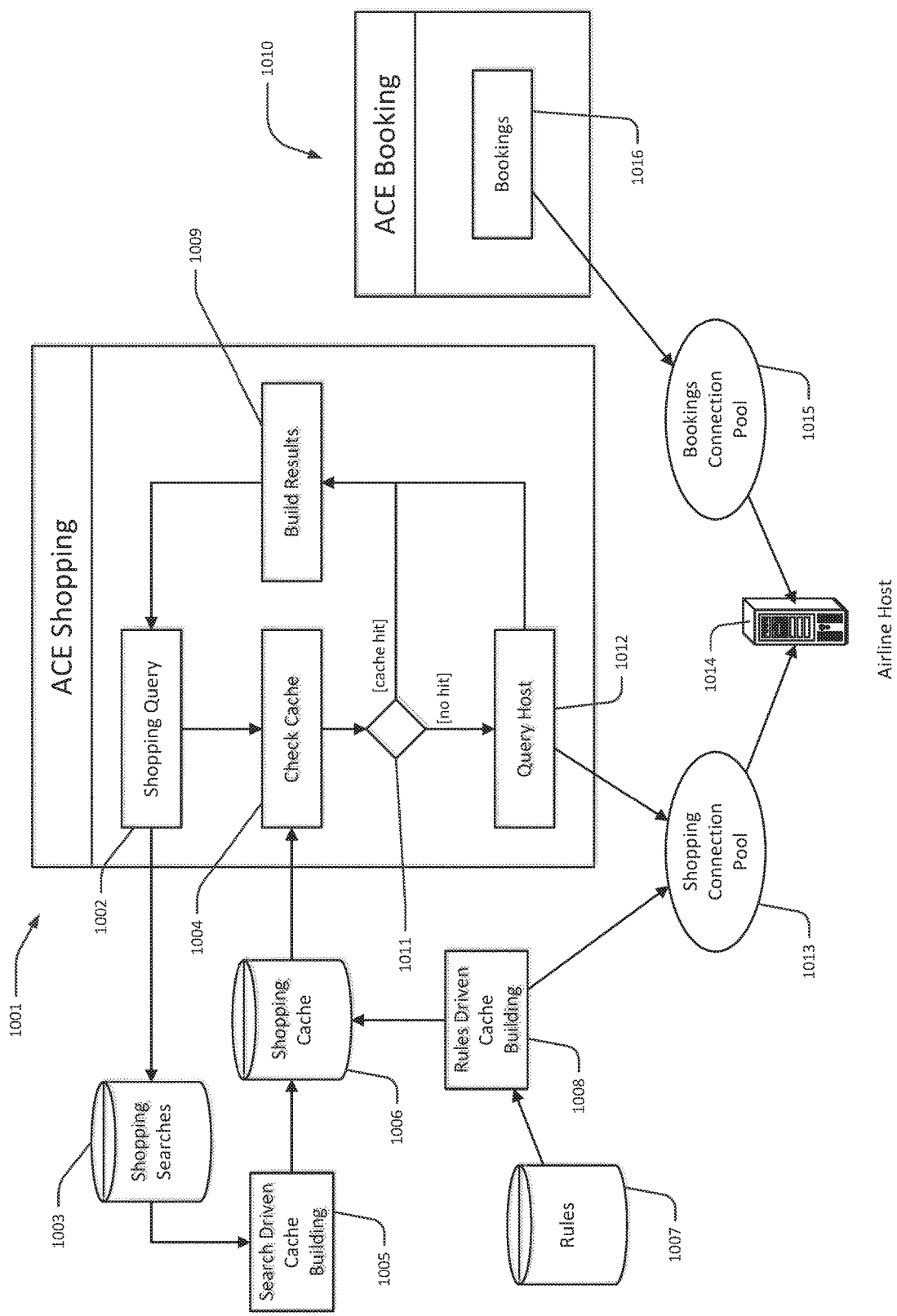
FIG. 10 shows a diagram of an embodiment of the ACE browse and book major components.
Figure 11:
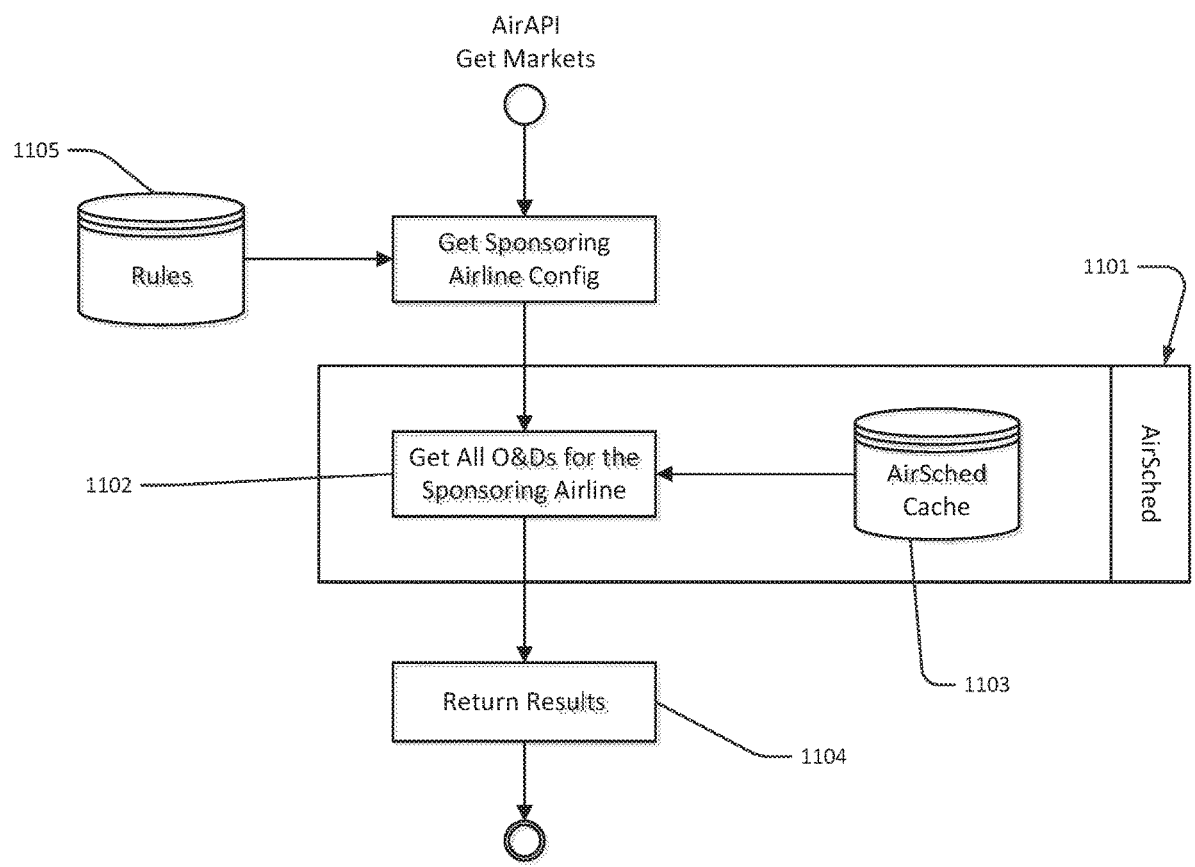
FIG. 11 shows a flow chart for an embodiment of the ACE get markets component.

As shown in FIG. 10, browsing and pricing calls to the airline hosts are relatively expensive in terms of time and system resources. ACE employs caching strategies to help provide a better user experience by improving performance and efficiently managing the access to the airline host.

Shown here are various details of the designs for the browsing cache and how the host connections are managed. Various embodiments of the system can utilize a self-generated cache or a cache generated from the airline's own source or even third party sources as and when necessary. A capability of the system for mixing disparate data sources is detailed through the description of the various exemplar system components.

Implementing the caching strategies brings with it the need for more interactions with the host in order to populate the cache. It is important that these connections are managed, in order to control the load on the host and prevent excessive and potentially costly hits on the host system.

Every connection to the host requires the host to establish a new session and allocate a session id/token/key for use with all subsequent requests made during that session. At the end of the session the session needs to be closed and the system resource released. Host system providers advise sensible use policies for starting and ending sessions in order not to incur unnecessary load on the system and to improve response times for the client.

Certain limits are also imposed by host providers to prevent excessive use or abuse of the system Some of these limits might be fixed, others might be thresholds which if frequently exceeded could result in penalties.

The client system (in this case ACE) needs to manage host connections and interactions in order to stay within the boundaries of reasonable usage. The limits include but are not limited to:
- The number of open connections
- The number of active sessions
- The number of simultaneous hits
- The volume of data requests/responses
- Look to Book ratios In various embodiments, certain strategies are implemented to manage caching and host connections.

In various embodiments, the Connection Pools 1013 and 1015 are used to manage host connections ACE. Whenever a process needs a new host connection it requests it from the pool and uses the connection returned from the pool. The connection pod will manage the number of connections to the host, blocking requests if limits are reached. It will also keep a certain number of connections to the host open with active sessions in order to prevent excessive numbers of sessions being created and destroyed In various embodiments, a Booking connection pool 1015 is used. Every booking 1016 requires a dedicated session which must be initiated specifically for that booking and terminated at the end of the booking. Therefore, a dedicated session pool is used to service booking requests. This is managed by the AirGateway code.

In various embodiments, browsing connection pool 1013 is used. Browsing requests do not need a dedicated session. Multiple, unrelated requests (whether to get availability or price) can be made in the same active session. Therefore, ACE has a separate (from the booking pool) connection pool for servicing browsing requests.

Browsing requests may come from two sources:
Live searches: where a user is actively using the system to browse 1012
Cache building searches: where the system is performing browsing and pricing requests to populate the cache 1006 in anticipation of demand from live searches In various embodiments, browsing requests 1002 may include both availability and pricing requests. The goal is to always service live searches from cache and never have to hit the airline hosts 1014. This ensures optimal performance for the end user. However, some live searches will inevitably have to hit the hosts at some times and these should always do so via the browsing connection pool.

The browsing connection pool must give priority to live searches over cache building searches. This means:
Making 100% of the service available to live searches if required i.e. cache building searches must only be serviced from idle connections.
Avoiding scenarios that lead to live sessions queuing or being blocked.
Ensuring that cache building connections release their connection at the earliest opportunity i.e. they do not hog connections needlessly.
The connection pool should ideally never need to start a new session in order to service a live search request. There should always be an idle, open session available. Thus, the number of idle connections in the pool must always be slightly more than current live demand and there should be a minimum number of idle, open sessions.
Cache building searches can be queued and processed during quiet/idle periods.
Other controls within the browsing connection pool may include:
A maximum number of open sessions
Control over the number of simultaneous hits to the host, e.g. using techniques such as delaying or throttling the cache building searches.
Time to Live (TTL) settings. These may vary according to the number of open connections e.g. as the number of active connections grows the TTL may decrease.
Maximum number of connections requested by a single process. This may be different for live searches and cache building searches.

Note the time to live for the connection to the host system and should not be confused with the time to live for a cached record which is used to prevent the cache becoming stale and out-of-date.

In various embodiments, Cache building is driven from two standpoints:
Live searches 1012
ACE Rules 1007

In various embodiments, the system tries to pre-empt user searches by anticipating the user's actions and pre-fetching flights based on their current searches and behavior. For example, if a user searches for flights from SYD-CNX O/W departing 20th October the system will either:
Perform a live search for a block of dates centered on the 20th October (e.g. 17th-24th October) in order to populate the carousel and then queue a cache builder request for the same search for 25th-31st October to anticipate the user paging forward in the carousel.
Perform a live search for just the 20th October and then queue a cache builder request for the same search for dates either side of the 20th October (i.e. 17th-19th and 21st-24th October) in order to populate the carousel asynchronously (in the background). Additionally, then queue, a cache builder request for the same search for 25th-31st October to anticipate the user paging forward in the carousel.

Other cache builder searches 1003 1005 will be added over time, based on user activity, particularly around popular markets.

Exemplar configurable ACE Rules
Various rules will define regular cache builder queries to be executed, these include:
Regular primary searches (each with a configurable element such as date/time specific or frequency to be run):

| Search | Frequency |
| --- | --- |
| All routes (approx. 65) for the next 180 days | Once a week |
| All routes for a window of dates that starts today + 1 week and ends today + 30 days (the window period needs to be a config parameter). | Daily |
| All routes on popular dates e.g. weekends | Daily |
| All routes on specific popular dates (e.g. holiday dates) | Weekly |
| Specific routes on specific dates (e.g. special events) | Weekly |
| Routes where the number of seats is below a configurable limit | Daily |

In various embodiments, priorities are assigned. Performance of the cache building for live searches is more important than for the ACE rules. If a live search for flights on a given date is made and this triggers a cache request to fetch flights for the following week, there is no benefit if this request is not completed before the user needs to see the flights for the next week. So, a delay in servicing these requests could provide no benefit to the user and could actually degrade overall system performance. Therefore, implementation of a fast queue and a slow queue concept for cache building searches would be a good way to address this. Cache building requests triggered by live searches would go onto the fast queue and other cache building requests would go onto the slow queue. The slow queue would only be serviced if the fast queue was empty. There may also be restrictions to prevent the slow queue being serviced during set peak times of the day.

It is important that the cached records remain current and fresh, in other words that they do not become stale or out-of-date, otherwise flights and prices may be offered which are no longer available.

All cache records will carry a Time to Live (TTL) value along with the date/time they were created. A cached record that has exceeded its TTL should not be used and can be deleted from the cache. TTL could be guaranteed by the airline in certain circumstances if the airlines so choose. Note that the cache doesn't necessarily need to be internal, for example a third party cache is also possible to, be managed by ACE.

Different TTL values may be used by different functions and processes according to the context in which the cache is being created. For example, a cached price for a flight that is close to its departure date may have a very short TTL, whereas a cached price for a flight that say 6 months away from departure will have a longer TTL because the price of flights is quite stable a long time before departure, but it becomes more volatile as the departure date gets closer.

In various embodiments, the cache relates to the host system(s) from which it was built. This means that the same cache can be shared between multiple environments or systems which share the same host system(s), for example a cache built for a carrier's test environment is correct for all systems feeding off the carrier test host and may be shared between these systems.

The browsing function builds a list of possible routes from the given Origin to the Destination 1102 using Air-Sched 1101. AirSched provides details of all hosts 1103 that service each possible segment of the whole journey and based on this AirBrowse makes browsing searches against the relevant hosts, provided that they are whitelisted by the Sponsor.

When all the candidate flights are returned the SmartRouter creates journey results 1104 by interlining the flights. This is where the interline rules are applied to create a set of results that is tailored to meet the Sponsor's requirements. The interline process and the ordering of the rules is detailed in the activity diagram in the design model.

In various embodiments duplicates exist or the only duplicates are those marked not the be filtered. So, the order of the airlines in the list determines the priority for showing results.

The table below illustrates an exemplar configuration that the Sponsor should be able to create.
Sponsor Airline: TZ

| Priority | Host | Carrier | Remove Duplicates |
|---|---|---|---|
| 1 | TZ | TZ | N |
| 2 | TZ | TR | N |
| 3 | TZ | SQ | N |
| 4 | TZ | VA | N |
| 5 | TZ | MI | N |
| 6 | XW | XW | N |
| 7 | DD | DD | Y |

All fields are mandatory. Priority is fixed 1-n for the number of carriers defined. Remove duplicates is Y or N. There is no limit to the number of host/carrier combinations that can be defined.

In the above example, when browsing for flights via an exemplar airline, if a journey leg returned routes from TR (from TZ) and XW and DD then the DD duplicate would be removed, leaving both the TR and XW flights. When browsing for flights via the air carrier IBE, if a journey leg returned routes from TZ, MI and DD then the DD duplicate would be removed, leaving the TZ and MI flights.

In various embodiments, a flight returned by a carrier must be able to be combined with the bundles that the Sponsor offers. The Sponsor must have configured and mapped the product class provided in the flight from the carrier to the appropriate Sponsor's bundle(s). If the mapping has not been defined, then the flight is not combinable and must be dropped. The respective Product mapping configuration contain the rules for each sponsor and host combinations.

Figure 12:
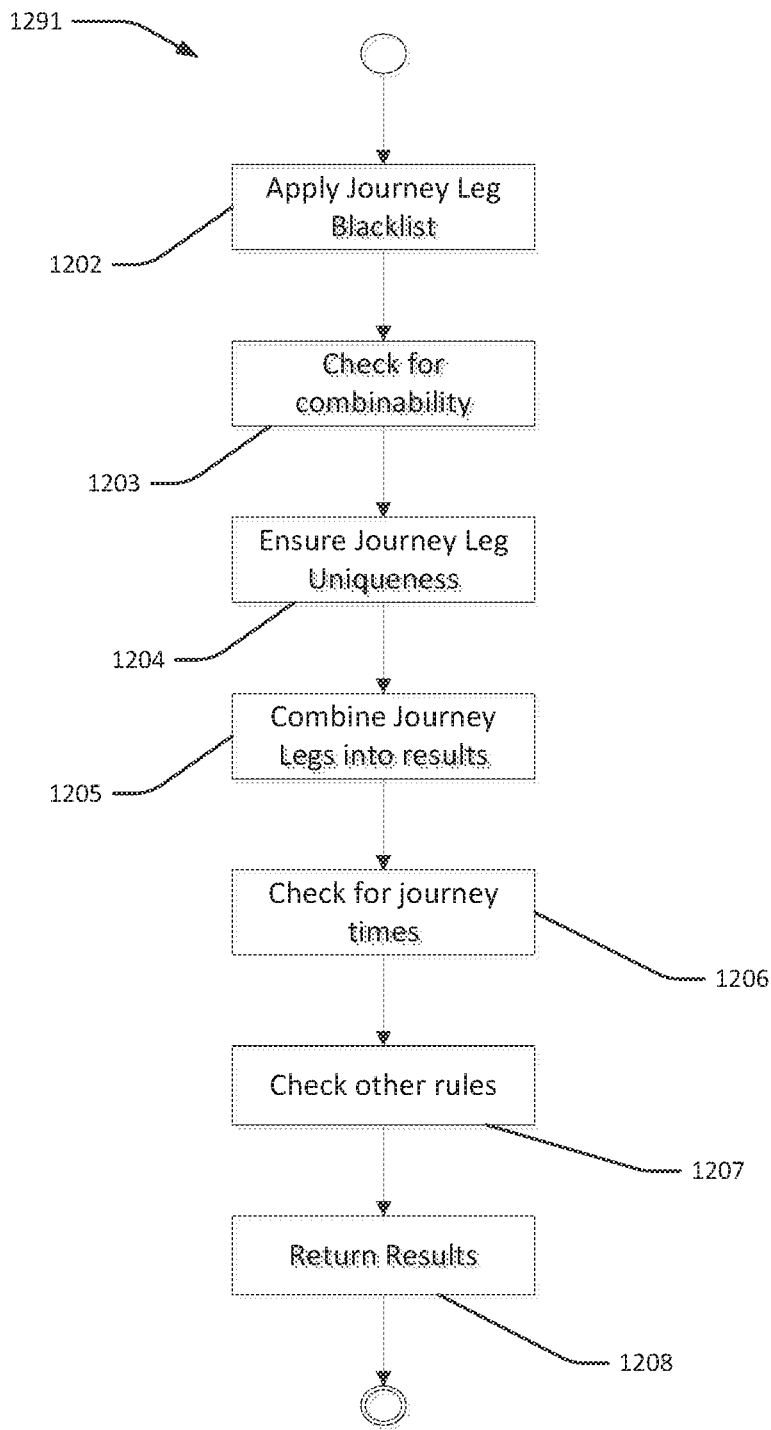
FIG. 12 shows a flow chart for an embodiment of the ACE interlining component.

In various embodiments, as shown in FIG. 12 for the interlining rule process 1201, the sponsor can blacklist specific journey legs 1202 (Origin and Destination pairs) so that these are never served from a specific airline. As an example, the airline may blacklist all other airlines from providing results for the SIN to DMK route. There are two types of blacklist: a hard blacklist, which says never include this and a soft blacklist, which says exclude this unless there are no results for the journey.

In various embodiments, a further configuration allows a Sponsor to conditionally exclude journey legs if they are not combined with at least one segment from a specific airline—typically the Sponsor. 1203, Multiple exclusion configurations may be provided for a sponsor, in which case finer grained definitions may permit a flight to be included in spite of a broader definition excluding it. This allows more general rules, such as exclude journey's that don't include the sponsor, except on a particular route where a flight provided by other airlines is acceptable should there be no flights available from the sponsor (see example 2 below for an example of this). For example, if a route leg or route is sold out or nearly sold, the system provides the capability to circumvent miles based on pricing or inconvenience. Additional rules are configurable and additive by the airline in real time.

The table below illustrates the configuration that the Sponsor should be able to make by way of an example:
Sponsor Carrier DD:

| Carrier | Origin | Destination | Type Condition |
|---|---|---|---|
| TR | SIN | DMK | H |
| TR | DMK | SIN | H |
| * | DMK | NKG | S |
| TR | DMK | CNX | S |

In various embodiments, the Type is H(ard) or S(oft) for an unconditional exclusion or an exclusion provided that there is at least one result remaining.

Condition is the airline code which must be present i.e. the specified segment(s) must be excluded unless it is combined, with at least one segment from airline XX.

"*" is a wildcard that means any. For Carrier, it means any airline other than the Sponsor's own carrier or their affiliates. For Origin and Destination, it means any origin or any destination.

The example case is further explained here: when browsing for flights via the carrier IBE, if a journey leg returned flights from TR between SIN and DMK, in either direction, then these journey legs would be removed. Flights between DNA and NKG on any airline other than the Sponsor (DD) would also be removed if they don't include at least one segment from DD unless there were no results for the journey, in which case they would be allowed.

| Carrier | Origin | Destination | Type Condition |
|---|---|---|---|
| * | * | H | DD |
| TR | DMK | CNX | S DD |

When browsing for flights via the sponsor carrier IBE, only journeys that include at least one segment from DD are permitted. However, if a journey leg returned routes from TR between DMK and CNX, then these journey legs would be permitted without a segment from DD in the journey, but only if there were no other results for that journey.

In various embodiments, when all the candidate flight results are provided by the airlines it may be that there is more than one airline offering flights on any given segment. In this case, the Sponsor may wish to discard the duplicate offerings and do so in such a way that favors their own or specific other airlines. Therefore, a Sponsor must be able to choose whether they want to limit the duplication of journey legs from different airlines or even to enforce uniqueness 1204 (i.e. one airline per journey leg). When filtering duplicates the Sponsor must be able to control which airline's flight takes priority, in other words which carrier's flights are dropped. The definition and configuration of this rule is combined with the Sponsor's airline'inclusion list rule above.

In various embodiments, a Sponsor can configure the Minimum Connection Time (MCT) and the system will not permit connections that fall below this time. The Sponsor can override the general MCT with an MCI for a specific airport if required.

In various embodiments, the system must also make sure that connections/layovers and total journey time are not excessive. The Sponsor can configure the Maximum Connection Time (MaxCT) 1206. They can override this for a specific airport if required to give a MaxMax CT if there is no possibility of one easy connection and a long layover is required.

In various embodiments, a rule may include the Maximum number of stops: The Sponsor configures the maximum number of stops for a journey and any journey that exceeds this maximum value should be dropped from the results 1207.

In various embodiments, a rule may include blocking journey fares greater than a certain percentage above the cheapest journey fare should be dropped from the results. The percentage value must be configurable by the Sponsor and applies across all flights from all airlines.

In various embodiments a ride may be included for blocking Circuitous routes: Journeys with a total mileage greater than a certain percentage above the shortest journey mileage should be dropped from the results. The percentage value must be configurable by the Sponsor and applies across all flights from all airlines. This rule relies on AirSched providing the mileage. Specific city and route override exclusion rule functionality is embodied within the system (as noted in 0115). In various embodiments, the Sponsor determines how other carrier bundles are mapped and aligned to their of bundle products. In various embodiments the both the sponsor or the partner airline may have additional specific rules it wishes to impose. The rules for imposing of these conditions can be adjusted by the airline either through a real-time control managed within the system (via the administration console called "AirAdmin" or through importing rules into the system from the airline's host environment.

Rules are not just for restricting results but can also be used to enhance an offer or service. For example, if a particular rule is used—in certain embodiments—offers can be folded into a particular users display so that they can take advantage of these enhanced offers uniquely in their work flow. Sponsors or other advertisers have In FIG. 13 a chart 1301 of product bundle classes 1302 are shown for 2 exemplar carriers 1307 and 1308. Names 1305 and corresponding codes 1306 are shown, along with a detailed description of the bundle components 1303.

Figure 14:
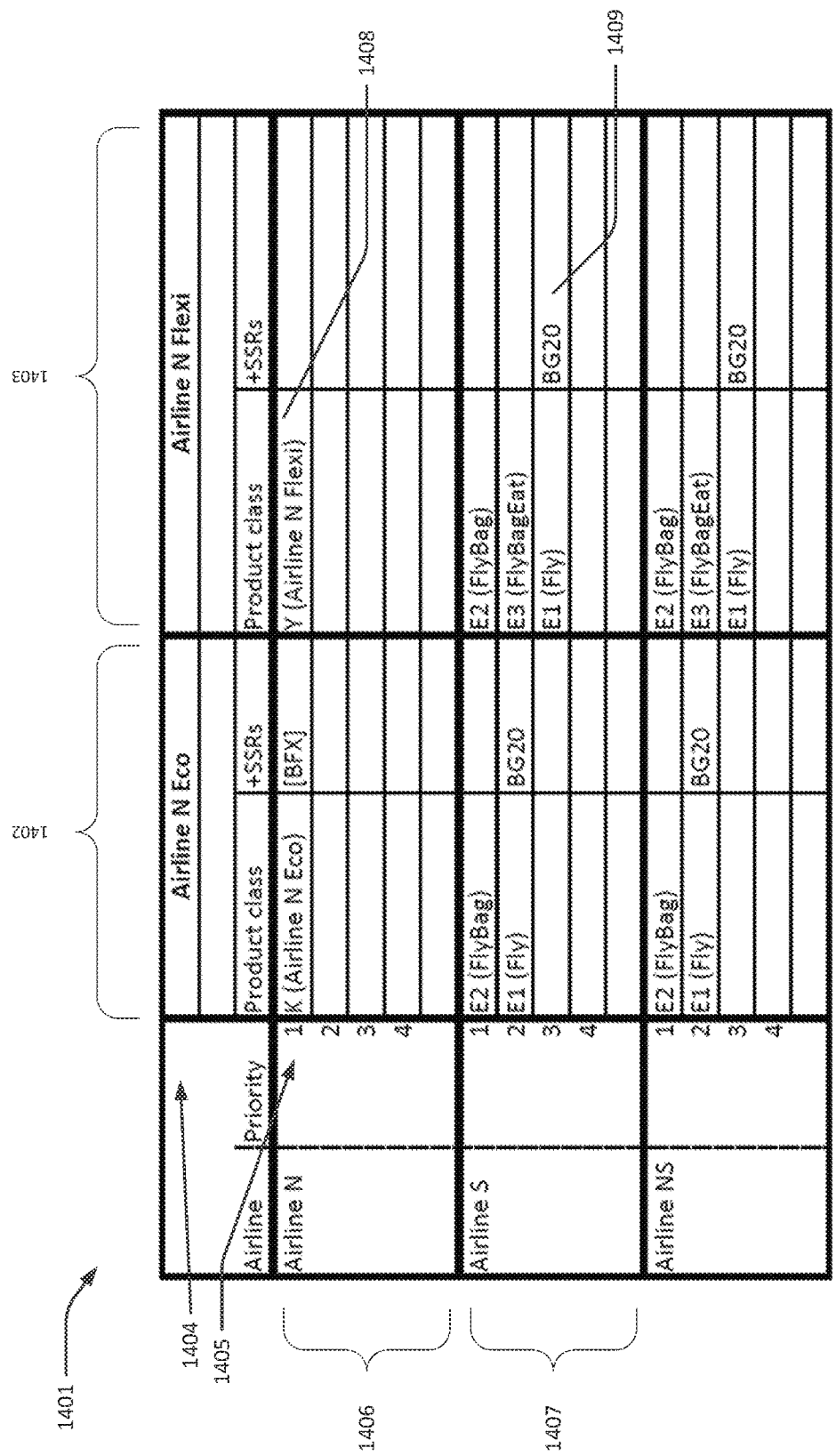
FIG. 14 shows an exemplar travel product bundle map between 2 exemplar airlines.

To generate a bundle map in various embodiments as is shown in FIG. 14, the product bundle map defines which of the carrier's product classes maps to each of the Sponsor's bundles. For each mapping they also specify the list of SSR codes that need to be automatically added (at the prevailing SSR price) to equalize the bundle benefits. Bundle maps may be populated in certain embodiments by a module which applies configurable logic instructions to determine the travel product alignment. Shown in the chart 1401 in FIG. 14 are corresponding product classes 1407 1408 for the exemplar airline. When interlined segments include segments from 2 airlines such as Airline N 1406 and airline S 1407 the aligned product classes are mapped 1408 and it needed for alignment, SSR's may be added 1409.

In various embodiments multiple carrier product classes can be mapped to each Sponsor bundle to allow for non-availability of a particular product class. The order of mapping determines the priority for selection. As an example, a carrier airline could map XW product classes E2, E1+BG20, E3 against their Fly Bag (E2) bundle so that an XW E2 product class is used as preference, but if not available and. E1 with the addition of SSR BG20 is used, otherwise if there is no E2 or E1 then and E3 is used.

In various embodiments the price can be altered to fit a particular rule whereby the price can be adjusted to match say a market competitive rate. Further Escalation can also give the user the option to override through the selection of specific, sectors in the future i.e. to separate the bundle of flights. Thus, products may be displayed which would otherwise not have been available to, a user according to the standard configurable logic instructions applied. For example, volatile political changes in certain regions or markets may make an otherwise inhospitable or unpleasant travel package or journey more palatable or even necessary for the user.

When a users search criteria yields a range of fares from the Sponsor, their partners and their affiliates, the separate airline segments need to be combined to create journeys aligned to the Sponsor's bundles in such a way that the benefits (bags, seats, meals, etc.) are as closely matched to the bundle as possible.

In various embodiments, the mapping is implemented by configurable to be done either explicitly or inferred according to airline guidance for the Sponsor's own product classes and also for those of their Partner and Affiliate Airlines.

When the, AirBrowse interlines fares from multiple airlines to create a journey, it is important that the benefits offered by those combined fares are closely matched so that they can be sold together under the relevant Sponsoring Airline's bundle. For example, an Airline S E2 fare could be combined with an Airline NS E2 fare and offered as a possible journey under the Airline S FlyBagEat bundle, or an Airline S J fare could be combined with an Airline N Y fare and offered as a possible journey under the Biz bundle.

When AirBrowse interlines fares from multiple airlines to create a journey, it is important that the benefits offered by those combined fares are closely matched so that they can be sold together under the relevant Sponsoring Airline's bundle. For example, an Airline S E1 product class could be combined with an Airline H F1 product class and offered as a possible journey under the Airline S Fly bundle, or an Airline S J product class could be combined with an Airline H F2 product class and offered as a possible journey under the Airline SBiz bundle.

For any journey, the goal of AirBrowse is to offer fares for as many of the Sponsor's bundles as possible, to give the user a comprehensive and attractive offering. In order to achieve this AirBrowse allows product classes to be combined with SSRs to 'construct' a bundle of benefits that closely matches one of the Sponsors bundles if there is no exact match of benefits with the product class alone. This concept means that a Sponsor could instinct AirBrowse to allow either an airline H F1 product class+a PB20 SSR or an F2 to be offered in the FlyBag bundle. In this case, if an Airline S E2 product class was available it could be combined with either an Airline H F1+PB20 or an F2 to offer the user a FlyBag bundle for the journey.

AirBrowse allows multiple product classes from an airline to be mapped to the same bundle as long as the priority is defined. It will then use the highest priority option that is available. As an example, a 'FlyBag' bundle could be populated with either an E2 product class, or an E3, or an E1+BG20 according to which of these product classes is available, with the first priority being an E2 and the second priority being either the E3 or the E1+BG20 according, the sponsor's preference. Once the minimum criteria are satisfied the system can permit a user to choose to raise or lower the choice of baggage (for example).

The Sponsor should use this table to define their preferences for mapping of their own, partner and affiliate product classes to their bundles and where ideal mappings are unavailable the alternatives with relevant SSRs should be defined.

AirBrowse allows multiple product classes from an airline to be mapped to the same bundle as long as the priority is defined. It will then use the highest priority option that is available. As an example, a 'FlyBag' bundle could be populated with either an E2 product class, or an E3, or an E1+BG20 according to which of these product classes is available, with the first priority being an E2 and the second priority being either the E3 or the E1+BG20 according the sponsor's preference.

The Sponsor should use this table to define their preferences for mapping of their own, partner and affiliate product classes to their bundles and where ideal mappings are unavailable the alternatives with relevant SSRs should be defined.

Figure 15:
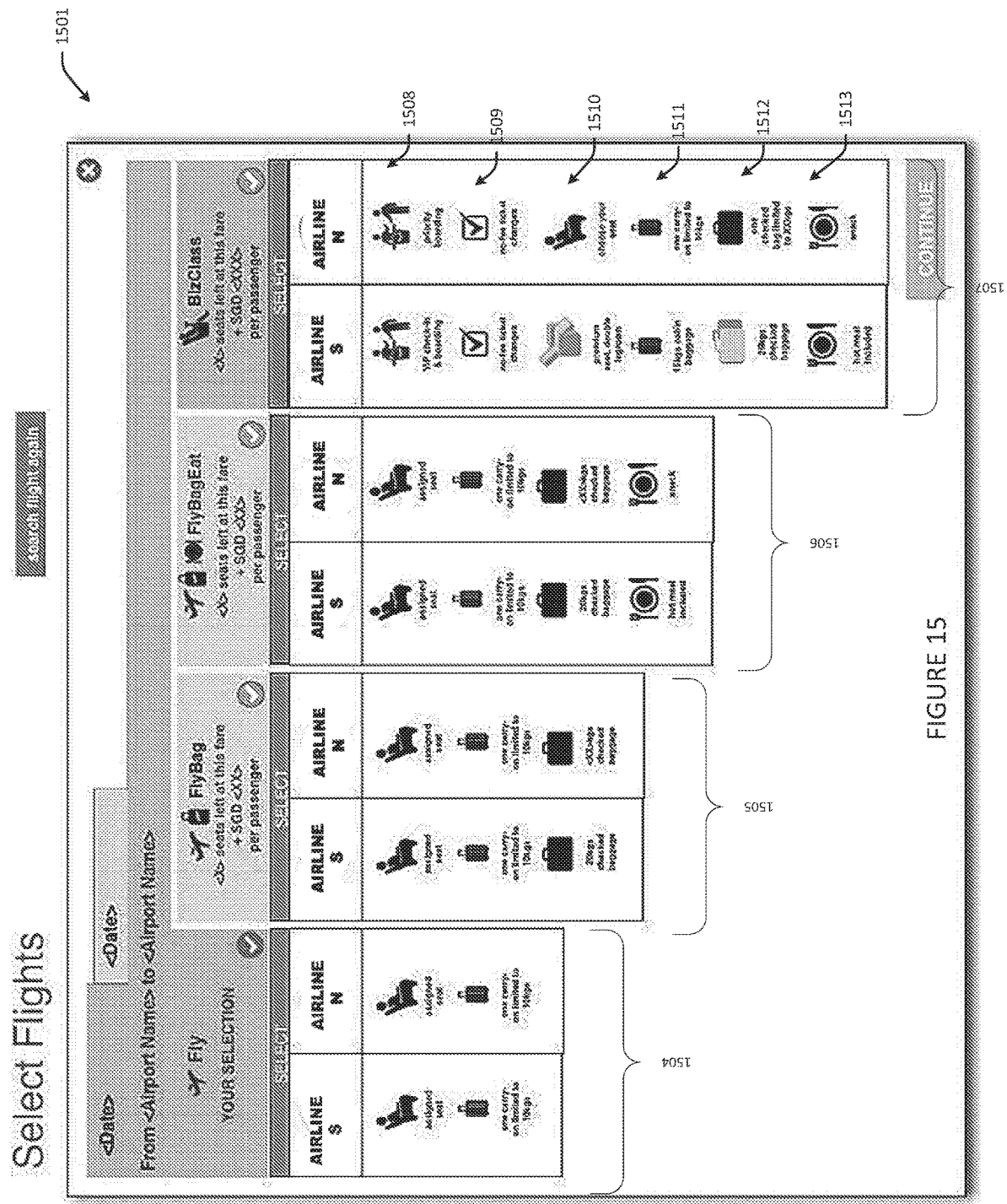
FIG. 15 shows an exemplar dynamic web page generated by an embodiment of the system showing travel product bundle alignment for a flight with interlined airline segments from 2 airlines.

An exemplar Bundle browsing web application page 1501 is presented in FIG. 15 for sponsor Airline S. The presented flight contains flight segments from Airline S 1502 and Airline N 1503. Shown for the sponsor airline are 4 product class bundles which include Fly 1504, FlyBag 1505, Fly Bag Eat 1506, and BizClass 1507. Each bundle aligns the various SSR elements of the bundle according to the bundle map which here includes priority seating/boarding 1508, no-fee flight changes 1509, stretch seating 1510, carry-on baggage 1511, check-in baggage, and meals 1513. Through the rule system the ACE platform allows an airline to dynamically or specifically to add products either bundled or separated or both, aligning the products for presentation to the consumer.

Figure 16:
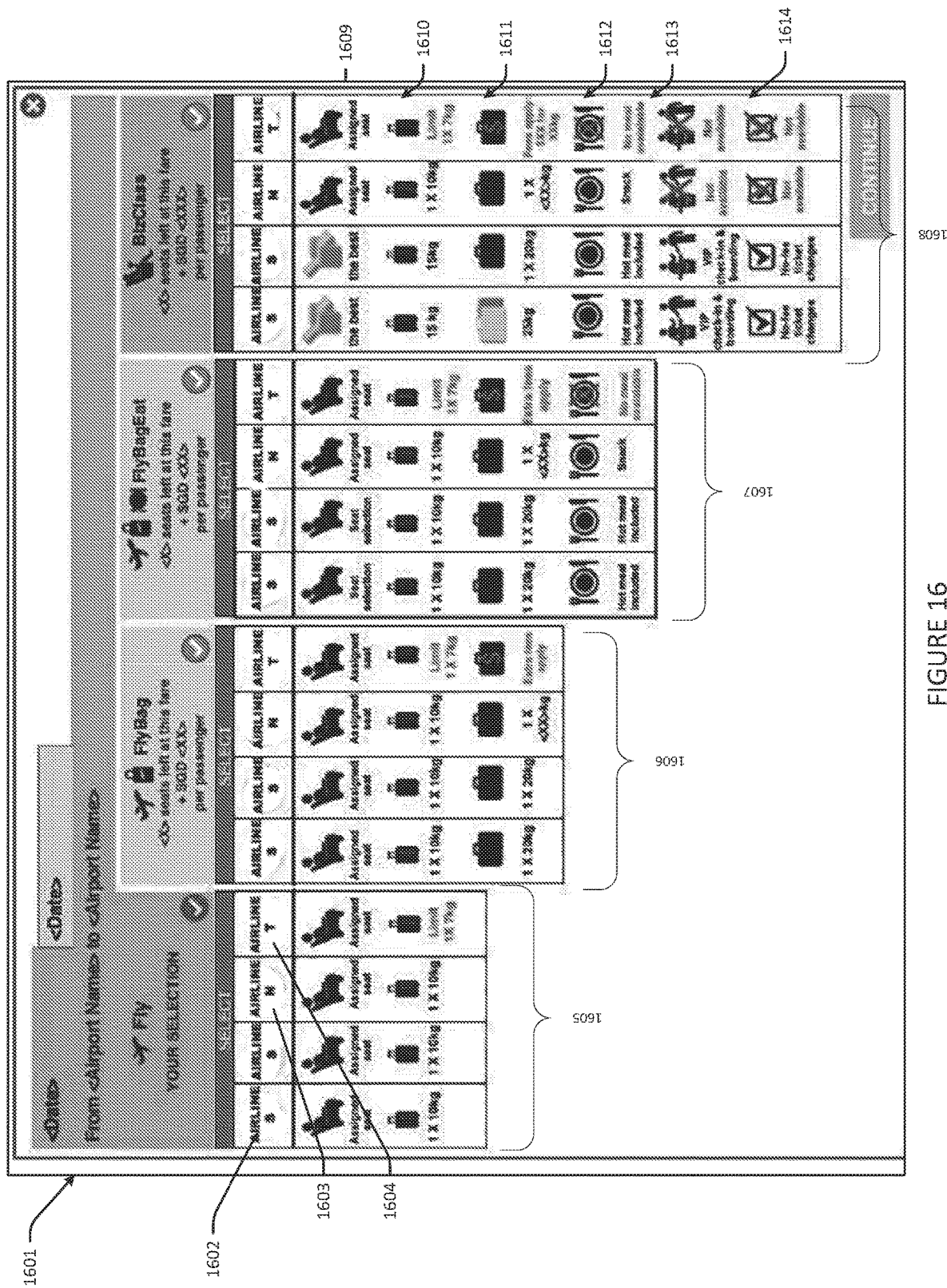
FIG. 16 shows an exemplar dynamic web page generated by an embodiment of the system showing travel product bundle alignment for a flight with interlined airline segments from 3 airlines.

A second exemplar Bundle browsing web application page 1601 is presented in FIG. 16 for sponsor Airline S. In this example, the present route includes 4 interlined flight segments for three different airlines. The presented flight contains flight segments from S 1602, Airline N 1603, and Airline T 1604. Shown for the sponsor airline are 3 product class bundles which include Fly 1605, FlyBag 1607 and FlyBagEat 1608. Each bundle aligns the Various SSR elements of the bundle according to the bundle map which here includes seat assignment 1609, carry-on options, 1610, checked baggage limits 1611 and meals 1612. Various embodiments may include the alignment of other travel products such as no-charge flight changes, VIP lounges, in-flight internet services, and stretched or wider seating, among numerous travel products which may not be aligned between airlines. Through, the rule system the ACE platform allows an airline to dynamically or specifically to add products either bundled or separated or both, aligning the products for presentation to the consumer.

The routines and/or instructions that may be executed by the one or more processing units to implement embodiments of the invention, whether implemented as part of an operating system or a specific application, component, program, object, module, or sequence of operations executed by each processing unit, will be referred to herein as "program modules", "computer program code" or simply "modules" or "program code." Generally, program modules may include routines, programs, objects, components, logic, data structures, and so on that perform particular tasks or implement particular abstract data types. Computer program code for carry lite out operations for aspects of the present invention may be written in any combination of one or more programming languages, including an object-oriented programming language such as Java, Smalltalk, C++ or the like and conventional procedural programming languages, such as the "C" programming language or similar programming languages. Given the many ways in which computer code may be organized into routines, procedures, methods, modules, objects, and the like, as well as the various manners in which program functionality may be allocated among various software layers that are resident within a typical computer (e.g., operating systems, libraries, API's, applications, apple's, etc.), it should be appreciated that the embodiments of the invention are not limited to the specific organization and allocation of program functionality described herein.

The flowcharts, block diagrams, and sequence diagrams herein illustrate the architecture, functionality, and operation of possible implementations of systems, methods, and computer program products according to various embodiments of the present invention. In this regard, each block in a flowchart, block diagram, or sequence diagram may represent a segment or portion of program code, which comprises one or more executable instructions for implementing the specified logical function(s) and/or act(s). Program code may be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the blocks of the flowcharts, sequence diagrams, and/or block diagrams herein, certain alternative implementations, the functions noted in the blocks may occur in a different order than shown and described. For example, a pair of blocks described and shown as consecutively executed may be instead executed concurrently, or the two blocks may sometimes be executed in the reverse order, depending upon the functionality involved. Each block and combinations of blocks can be implemented by special purpose hardware-based systems that perform the specified functions or acts, or combinations of special purpose hardware and computer instructions.

The program code embodied in any of the applications described herein is capable of being individually or collectively distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While the invention has been illustrated by a description of various embodiments and while these embodiments have been described in considerable detail, it is not the intention of the applicants to restrict or in any way limit, the scope of the appended claims to such detail. Additional advantages and modifications will readily appear to those skilled in the art. For example, the embodiments of the invention may be used in conjunction with other travel-related applications aside from travel booking and travel search queries, such as itinerary management, flight status, etc., that are also heavily dependent on interactive forms and interactive form flows. The invention in its broader aspects is therefore not limited to the specific details, representative methods, and illustrative examples shown and described. Accordingly, departures may be made from such details without departing from the spirit or scope of applicants' general inventive concept.

We claim:

1. A method for dynamic real-time filtering and cross-selling of travel products comprising:
    processing, by an air connection engine, a user query to a travel product sponsor company received over a wide area network to retrieve one or more travel route products from one or more travel route product databases;
    automatically filtering and transforming, by a processor, the one or more retrieved travel route products according to a set of travel routing configurable logic instructions associated with the travel product sponsor company stored on a travel connect engine database, wherein the retrieved travel route products are configured according to one or more data schemas, wherein the one or more data schemas may be either schema compliant with the new distribution capability or schema not compliant with the new distribution capability;
    automatically filtering the one or more travel route products according to a set of sponsor travel company service level configurable logic instructions, wherein one or more affiliated travel company travel products are matched to sponsor travel company service levels according to a sponsor travel company service level ancillary travel product priority map which selects affiliate travel company bundled ancillary travel products and unbundled ancillary travel products based on sponsor travel company configurable priority levels and availability; and
    communicating to the user by a sponsor travel company configured user interface, the filtered travel route products and associated ancillary travel products mapped to product service levels of the sponsor travel company.

2. The method of claim 1 wherein the sponsor travel company configured user interface is a web application user interface.

3. The method of claim 1 wherein the filtered user query is communicated to the air connection engine by a web user interface.

4. The method of claim 1 wherein air travel connection engine further comprises an air connection engine application programming interface which is configured to communicate queries to and results from one or more sources of travel product information.

5. The method of claim 4 wherein the air connection engine application programming interface is configured to operate with a plurality of travel product sponsor companies and travel product information source databases utilizing a common set of available computer instructions.

6. The method of claim 4 wherein the air connection engine application programming interface is configured to operate with a plurality of travel product sponsor companies and travel product information source databases utilizing a common set of available computer instructions, wherein the computer instructions are stored in non-transitory computer memory, wherein the computer instructions are compliant with the new distribution capability standard.

7. The method of claim 1 wherein the ancillary travel products comprise at least one of: passenger seating options, passenger baggage options, passenger meal options, onboard Wi-Fi services, onboard media services, onboard duty-free merchandising.

8. The method of claim 1 wherein the air connection engine is configured to access one or more database sources of travel product information.

9. The method of claim 8 wherein the database sources of travel product information comprise at least one of: airline companies, third party airline data aggregators, rental car companies, hotels, catering companies, restaurants, in-flight passenger Wi-Fi service providers and in-flight media services providers.

10. The method of claim 8 wherein the database sources of travel product information comprise at least one of: airline companies, rail companies, ferry companies, car services, tour companies, third party airline data aggregators, rental car companies, hotels, catering companies, restaurants, in-flight passenger Wi-Fi service providers and in-flight media services providers.

11. A system for dynamic real-time filtering and cross-selling of travel products comprising:
    a first server configured to execute an air connection engine, wherein the air connection engine processes a user query to a travel product sponsor company received over a wide area network to retrieve one or more travel route products from one or more travel route product databases;
    at least one of the first server or a second server being configured to execute an internet booking engine communicatively coupled to the air connection engine, the internet booking engine configured to process and communicate travel product information to and from users by an internet web application interface using at least one processor, wherein the internet booking engine:

automatically filters and transforms, using the at least one processor, the one or more retrieved travel route products according to a set of travel routing configurable logic instructions associated with the travel product sponsor company stored on a travel connect engine database, wherein the retrieved travel route products are configured according to one or more data schemas, wherein the one or more data schemas may be either schema compliant with the new distribution capability or schema not compliant with the new distribution capability;

automatically filters, using the at least one processor, the one or more travel route products according to a set of sponsor travel company service level configurable logic instructions, wherein one or more affiliated travel company travel products are matched to sponsor travel company service levels according to a sponsor travel company service level ancillary travel product priority map which selects affiliate travel company bundled ancillary travel products and unbundled ancillary travel products based on sponsor travel company configurable priority levels and availability; and communicating, using the at least one processor, to the user by a sponsor travel company configured user interface, the filtered travel route products and associated ancillary travel products mapped to product service levels of the sponsor travel company.

12. The system of claim 11 wherein the air connection engine further comprises an air connection engine application programming interface which is configured to communicate queries to and results from one or more sources of travel product information.

13. The system of claim 12 wherein the air connection engine application programming interface is configured to operate with a plurality of travel product sponsor companies and travel product information source databases utilizing a common set of available computer instructions.

14. The system of claim 12 wherein the air connection engine application programming interface is configured to operate with a plurality of travel product sponsor companies and travel product information source databases utilizing a common set of available computer instructions, wherein the computer instructions are stored in non-transitory computer memory, wherein the computer instructions are compliant with the new distribution capability standard.

15. The system of claim 11 wherein the air connection engine is configured to access one or more database sources of travel product information.

16. The system of claim 15 wherein the database sources of travel product information comprise at least one of: airline companies, third party airline data aggregators, rental car companies, hotels, catering companies, restaurants, in-flight passenger wifi service providers and in-flight media services providers.

17. The system of claim 11 wherein the ancillary travel products comprise at least one of: passenger seating options, passenger baggage options, passenger meal options, onboard Wi-Fi services, onboard media services, onboard duty-free merchandising.

18. Non-transitory computer readable media comprising computer instructions executed by a computing device for dynamic real-time filtering and cross-selling of travel products comprising:

instructions for processing, by an air connection engine, a user query to a travel product sponsor company received over a wide area network to retrieve one or more travel route products from one or more travel route product databases;

instructions for automatically filtering and transforming, by a processor, the one or more retrieved travel route products according to a set of travel routing configurable logic instructions associated with the travel product sponsor company stored on a travel connect engine database, wherein the retrieved travel route products are configured according to one or more data schemas, wherein the one or more data schemas may be either schema compliant with the new distribution capability or schema not compliant with the new distribution capability;

instructions for automatically filtering the one or more travel route products according to a set of sponsor travel company service level configurable logic instructions, wherein one or more affiliated travel company travel products are matched to sponsor travel company service levels according to a sponsor travel company service level ancillary travel product priority map which selects affiliate travel company bundled ancillary travel products and unbundled ancillary travel products based on sponsor travel company configurable priority levels and availability; and instructions for communicating to the user by a sponsor travel company configured user interface, the filtered travel route products and associated ancillary travel products mapped to product service levels of the sponsor travel company.

19. The non-transitory computer readable media of claim 18 wherein the air connection engine further comprises an air connection engine application programming interface which is configured to communicate queries to and results from one or more sources of travel product information.

20. The non-transitory computer readable media of claim 19, wherein the air connection engine application programming interface is configured to operate with a plurality of travel product sponsor companies and travel product information source databases utilizing a common set of available computer instructions.

* * * * *